United States Patent
Kamada et al.

(10) Patent No.: US 10,309,533 B2
(45) Date of Patent: Jun. 4, 2019

(54) SHIFT CONTROLLER FOR VEHICLE

(71) Applicants: TOYOTA JIDOSHA KABUSHIKI KAISHA, Toyota-shi, Aichi-ken (JP); DENSO CORPORATION, Kariya, Aichi-pref. (JP)

(72) Inventors: Atsushi Kamada, Miyoshi (JP); Hideki Kubonoya, Toyota (JP); Koji Sakaguchi, Kariya (JP); Yusaku Kawaguchi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 15/669,337

(22) Filed: Aug. 4, 2017

(65) Prior Publication Data

US 2018/0045309 A1    Feb. 15, 2018

(30) Foreign Application Priority Data

Aug. 9, 2016    (JP) .................................. 2016-157035

(51) Int. Cl.
*F16H 63/34* (2006.01)
*F16H 61/02* (2006.01)
(Continued)

(52) U.S. Cl.
CPC ..... *F16H 63/3466* (2013.01); *F16H 61/0213* (2013.01); *F16H 61/12* (2013.01);
(Continued)

(58) Field of Classification Search
CPC .... F16H 63/3466; F16H 1/0213; F16H 61/12; F16H 61/28; F16H 2061/326; B60K 17/346
See application file for complete search history.

(56) References Cited

U.S. PATENT DOCUMENTS 8,734,295 B2 * 5/2014 Kanai ..................... F16H 61/12
477/183
9,115,804 B2 * 8/2015 Ono .................... F16H 61/0213
(Continued)

FOREIGN PATENT DOCUMENTS

| JP | 4248290 B2 | 4/2009 |
| JP | 2011-247304 A | 12/2011 |
| WO | 2011/101973 A1 | 8/2011 |

*Primary Examiner* — Stacey A Fluhart
(74) *Attorney, Agent, or Firm* — Oliff PLC

(57) ABSTRACT

A shift controller for a vehicle includes a shift switching unit, a rotation restricting element, and an electronic control unit. The electronic control unit is configured to: acquire a count value corresponding to a degree of rotation of an actuator; set a rotational position of the actuator when the count value does not change by restricting rotation of the actuator using the rotation restricting element as a reference position of the actuator corresponding to the predetermined shift position; and interrupt setting the reference position of the actuator and restart setting the reference position of the actuator when the rotation of the actuator is restricted and a supply voltage to the actuator is equal to or lower than a predetermined first voltage determination value or a variation in the count value while the rotation of the actuator is restricted is equal to or greater than a predetermined value.

7 Claims, 11 Drawing Sheets

(51) Int. Cl.
  *F16H 63/30*    (2006.01)
  *F16H 61/12*    (2010.01)
  *F16H 61/28*    (2006.01)
  *B60K 17/346*   (2006.01)
  *B60W 10/101*   (2012.01)
  *B60W 10/184*   (2012.01)
  *F16H 59/02*    (2006.01)
  *F16H 59/44*    (2006.01)
  *F16H 59/12*    (2006.01)
  *F16H 63/42*    (2006.01)
  *F16H 61/32*    (2006.01)

(52) U.S. Cl.
  CPC ......... *F16H 61/28* (2013.01); *F16H 63/3043* (2013.01); *F16H 63/3475* (2013.01); *B60K 17/346* (2013.01); *B60W 10/101* (2013.01); *B60W 10/184* (2013.01); *F16H 59/12* (2013.01); *F16H 63/3425* (2013.01); *F16H 63/42* (2013.01); *F16H 2059/0282* (2013.01); *F16H 2059/443* (2013.01); *F16H 2061/1292* (2013.01); *F16H 2061/283* (2013.01); *F16H 2061/326* (2013.01)

(56)         References Cited

U.S. PATENT DOCUMENTS

2003/0222617  A1*  12/2003  Nakai ................ F16H 61/32
                                                    318/701
2012/0309590  A1   12/2012  Kanai et al.
2014/0210395  A1*   7/2014  Nagata ................ H02P 31/00
                                                    318/671

* cited by examiner

SHIFT CONTROLLER FOR VEHICLE

INCORPORATION BY REFERENCE

The disclosure of Japanese Patent Application No. 2016-157035 filed on Aug. 9, 2016 including the specification, drawings and abstract is incorporated herein by reference in its entirety.

BACKGROUND

1. Technical Field

The present disclosure relates to a shift controller for a vehicle that sets a reference position of an actuator and more particularly to a shift controller that suppresses a decrease in accuracy for setting a reference position of an actuator due to a decrease in voltage supplied to the actuator at the time of performing reference position setting control.

2. Description of Related Art

In a vehicle including a shift switching unit configured to switch a shift position of the vehicle to one of a plurality of shift positions by driving an actuator which is supplied with power from a power supply and a rotation restricting element configured to restrict rotation of the actuator in a predetermined direction at a predetermined shift position of the plurality of shift positions, a so-called shift-by-wire shift controller that controls electrical switching of the shift position of the vehicle by driving the actuator based on a signal which is input in response to a driver's operation of a shift operating unit is known. A shift controller provided in a hybrid vehicle is disclosed as an example thereof in Japanese Patent No. 4248290. In Japanese Patent No. 4248290, the actuator that switches a shift position includes a pulse generator, the example, an encoder, that outputs a pulse signal corresponding to a degree of rotation of the actuator. The shift switching unit is controlled such that a target shift position is set by driving the actuator such that a count value of the pulse signal output from the encoder (an encoder count value) reaches a target encoder count value corresponding to each shift position. Only a degree of rotation (a rotation angle) of the actuator from a rotational position at a shift position at the time of starting the shift controller can be detected from the output signal of the encoder, and a reference position corresponding to a predetermined shift position, for example, a parking position (a P position), for controlling driving of the actuator needs to be set in order to appropriately control the shift position by driving the actuator.

Accordingly, when the shift controller is started, for example, when the vehicle is powered on, reference position setting control of setting the reference position of the actuator is performed. The reference position setting control causes the actuator to rotate to output a predetermined torque until rotation of the actuator is restricted by the rotation restricting element that restricts the rotation in a predetermined direction of the actuator disposed in the shift switching unit, detects a state in which the output signal of the actuator does not vary over a predetermined time, and sets a rotation stop position of the actuator in the state in which the output signal does not vary over the predetermined time as the reference position of the actuator corresponding to a predetermined shift position (for example, a P position or a non-P position). The reference position of the actuator is corrected, for example, by an amount of deflection or an angle of deflection of the rotation restricting element which is calculated based on an output torque of the actuator from a predetermined map. Accordingly, in order to set the reference position of the actuator with high accuracy, it is necessary to drive the actuator such that a predetermined torque is output therefrom in the reference position setting control.

SUMMARY

On the other hand, it is conceivable that the shift controller for the vehicle that performs the above-mentioned reference position setting control of the actuator is applied to a vehicle including an internal combustion engine as a driving source and a power supply supplying electric power to a starter motor that cranks the internal combustion engine at the same time as supplying electric power to the actuator is provided in the vehicle. In such a vehicle, there is a likelihood that reference position setting control of the actuator and cranking control of the internal combustion engine based on driving of the starter motor are performed in the same time when the vehicle is powered on, and a drive voltage of the actuator varies (decreases) with a decrease in a source voltage and the torque of the actuator in the reference position setting control varies (decreases) when the starter motor and the actuator are supplied with the electrical power from the common power supply. Accordingly, in the reference position setting control, there is a likelihood that the reference position of the actuator will not be determined with high accuracy due to a variation in rotational position of the actuator when the rotation of the actuator is restricted by the rotation restricting element.

The present disclosure provides a shift controller for a vehicle that suppresses a decrease in accuracy for setting a reference position of an actuator due to a decrease in drive voltage of the actuator at the time of performing reference position setting control.

According to an aspect of the present disclosure, there is provided a shift controller for a vehicle including a shift switching unit, a rotation restricting element, and an electronic control unit. The shift switching unit is configured to switch a shift position of the vehicle to one of a plurality of shift positions by driving an actuator which is supplied with power from a power supply. The rotation restricting element is configured to restrict rotation of the actuator in a predetermined direction at a predetermined shift position among the plurality of shift positions. The electronic control unit is configured to: acquire a count value corresponding to a degree of rotation of the actuator; set a rotational position of the actuator when the count value does not change by restricting rotation of the actuator using the rotation restricting element as a reference position of the actuator corresponding to the predetermined shift position; and interrupt setting the reference position of the actuator and restart setting the reference position of the actuator when the rotation of the actuator is restricted by the rotation restricting element and a supply voltage to the actuator is equal to or lower than a predetermined first voltage determination value or a variation in the count value while the rotation of the actuator is restricted by the rotation restricting element is equal to or greater than a predetermined value.

In the shift controller for a vehicle according to this aspect, at the time of setting the reference position of the actuator, it is possible to prevent setting of the reference position from being performed in a state in which the supply voltage to the actuator is low and a predetermined torque required for setting the reference position with high accuracy is not output from the actuator. Accordingly, it is possible to suppress a decrease in accuracy for setting the reference position of the actuator due to a decrease in a drive voltage of the actuator at the time of performing reference position setting control and to prevent shift position switching control from being performed based on a reference position with low accuracy of the actuator.

In the shift controller for a vehicle according to the aspect, the electronic control unit may be configured to count the number of interruptions in setting the reference position of the actuator, and the electronic control unit may be configured not to restart setting the reference position of the actuator but to end setting the reference position of the actuator when the number of interruptions is equal to or greater than a predetermined value.

In the shift controller for a vehicle according to this aspect, it is possible to prevent a decrease in responsiveness to a start request from a driver or the like, for example, because a shift position switching request from the driver is not accepted due to repetition of control of setting the reference position of the actuator.

In the shift controller for a vehicle according to the aspect, the electronic control unit may be configured to interrupt setting the reference position of the actuator and to restart setting the reference position of the actuator when rotation of the actuator is restricted by the rotation restricting element and a difference between the count value at the time of starting rotation of the actuator and the count value in a state in which the count value does not vary is equal to or less than a predetermined value.

In the shift controller for a vehicle according to this aspect, at the time of setting the reference position of the actuator, it is possible to prevent restarting of setting the reference position in a state in which a predetermined torque required for setting the reference position with high accuracy is not output from the actuator when the difference between the count value at the time of starting rotation of the actuator and the count value in a state in which the count value does not vary is equal to or less than a predetermined value. Accordingly, it is possible to suppress a decrease in accuracy for setting the reference position of the actuator due to a decrease in a drive voltage of the actuator at the time of performing reference position setting control and to prevent shift position switching control from being performed based on a reference position with low accuracy of the actuator.

In the shift controller for a vehicle according to the aspect, the electronic control unit may be configured to restart setting the reference position of the actuator when a duration of a state in which the supply voltage to the actuator is lower than a second voltage determination value which is set to be higher than the first voltage determination value is less than a predetermined time after the setting of the reference position is interrupted.

In the shift controller for a vehicle according to this aspect, setting the reference position of the actuator is not repeated when there is a high likelihood that the supply voltage to the actuator will be equal to or lower than the first voltage determination value. Accordingly, it is possible to prevent a decrease in responsiveness to a start request from a driver or the like, for example, because a shift position switching request from the driver is not accepted.

In the shift controller for a vehicle according to the aspect, the electronic control unit may be configured to restart setting the reference position of the actuator when a duration of a state in which an internal combustion engine is cranked by driving of a starter motor which is supplied with power from the power supply is less than a predetermined time after the setting of the reference position of the actuator is interrupted.

In the shift controller for a vehicle according to this aspect, setting of the reference position of the actuator under cranking of the engine in which the voltage supplied to the actuator is likely to vary or decrease and there is a high likelihood that the supply voltage to the actuator will be equal to or lower than the first voltage determination value is not repeated. Accordingly, it is possible to prevent a decrease in responsiveness to a start request from a driver or the like, for example, because a shift position switching request from the driver is not accepted.

In the shift controller for a vehicle according to the aspect, the electronic control unit may be configured to restart setting the reference position of the actuator when a duration of a state in which the supply voltage to the actuator is lower than the second voltage determination value from a time point at which the count value of the actuator is returned to the count value at the time of starting rotation of the actuator is less than a predetermined time after the setting of the reference position is interrupted.

In the shift controller for a vehicle according to this aspect, when the standby time in which setting of the reference position is not performed again but is waited for due to a state in which the supply voltage to the actuator is lower than the second voltage determination value from a time point at which the count value of the actuator is returned to the count value at the time of starting rotation of the actuator after the setting of the reference position is interrupted is equal to or greater than a second lower-voltage duration determination time, the control for setting the reference position of the actuator is ended without performing setting of the reference position again. Accordingly, it is possible to prevent a decrease in responsiveness to a start request from a driver or the like, for example, because a shift position switching request from the driver is not accepted.

In the shift controller for a vehicle according to the aspect, the electronic, control unit may be configured to restart setting the reference position of the actuator when a duration of a state in which the internal combustion engine is cranked from a time point at which the count value of the actuator is returned to the count value at the time of starting rotation of the actuator is less than a predetermined time after the setting of the reference position is interrupted.

In the shift controller for a vehicle according to this aspect, when the standby time in which setting of the reference position is not performed again but waited for due to cranking of the internal combustion engine from a time point at which the count value of the actuator is returned to the count value at the time of starting rotation of the actuator after the setting of the reference position of the actuator is interrupted is equal to or greater than a second cranking duration determination time setting the reference position of the actuator is ended without performing setting of the reference position again. Accordingly, it is possible to prevent a decrease in responsiveness to a start request from a driver or the like, for example, because a shift position switching request from the driver is not accepted.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 1 is a diagram schematically illustrating a configuration of a power transmission path from an engine to driving wheels in a vehicle to which the present disclosure is applied and is also a block diagram illustrating a principal part of a control system which is disposed in the vehicle to control a shift switching unit and the like;

DETAILED DESCRIPTION OF EMBODIMENTS

Hereinafter, a shift controller for a vehicle according to an embodiment of the present disclosure will be described in detail with reference to the accompanying drawings.

Figure 1:
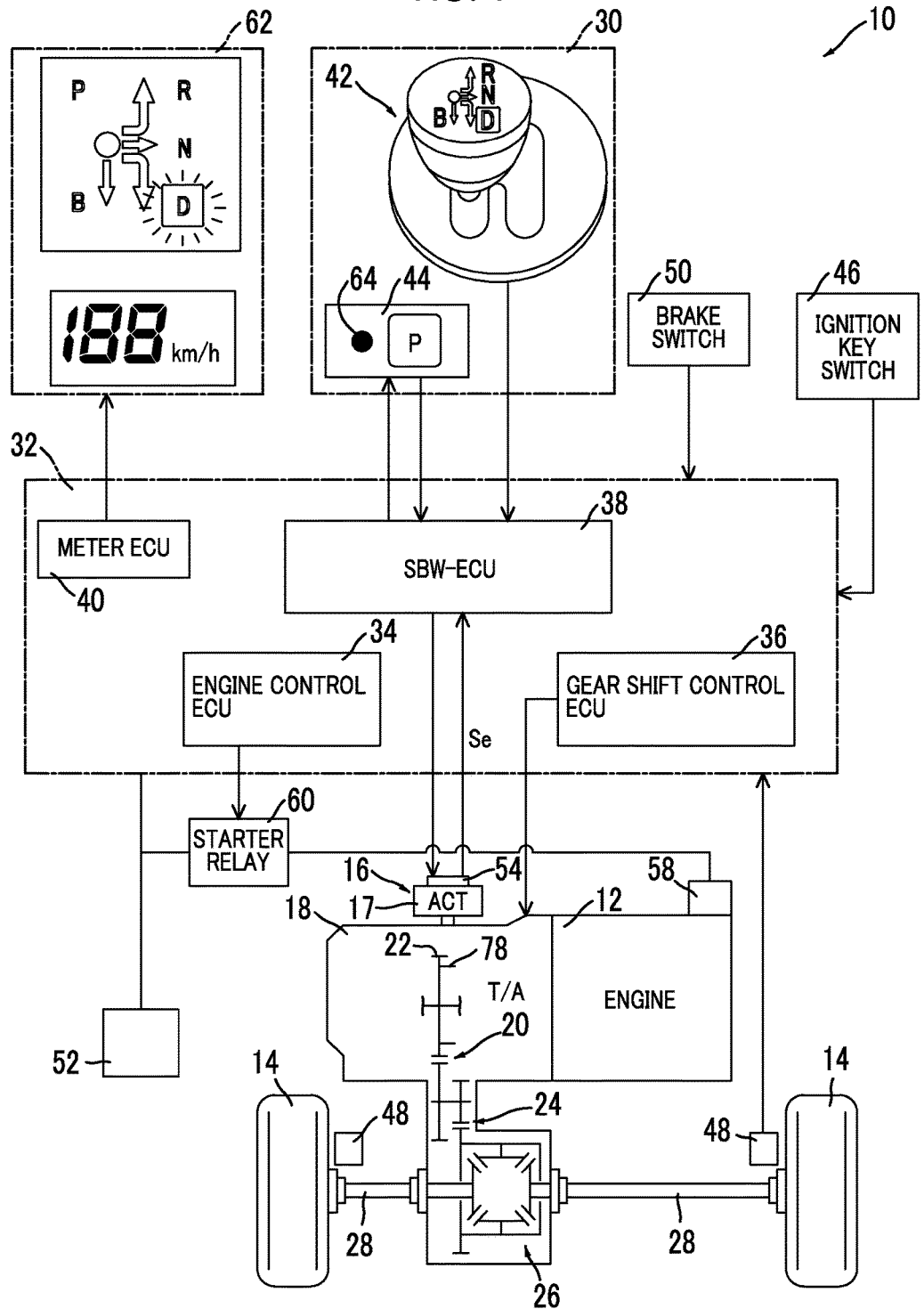
Figure 2:
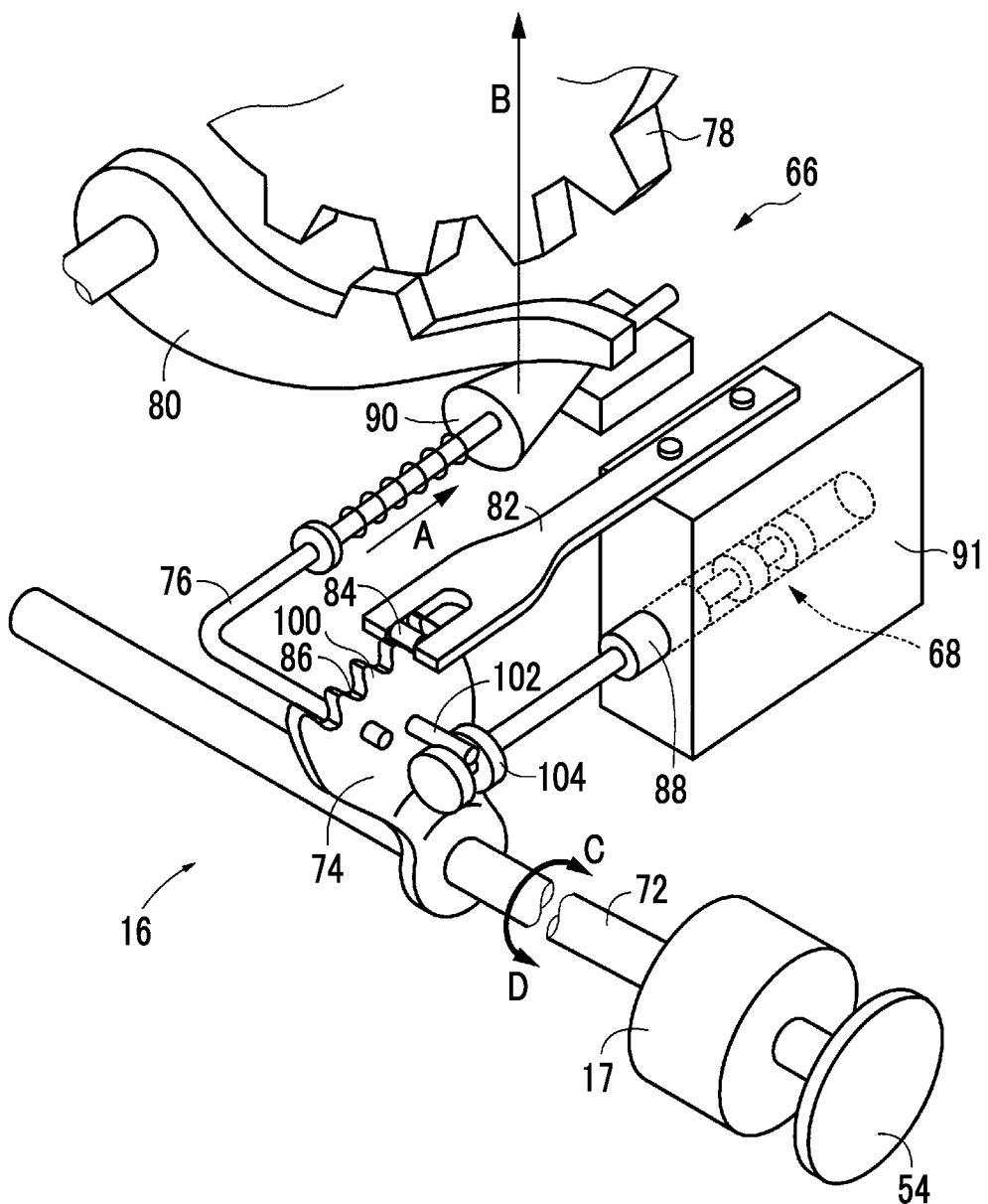
FIG. 2 is a perspective view illustrating the shift switching unit illustrated in FIG. 1.

FIG. 1 is a diagram schematically illustrating a configuration of a power transmission path from an engine 12 to driving wheels 14 in a vehicle 10 to which the present disclosure is applied and is also a block diagram illustrating a principal part of a control system which is disposed in the vehicle 10 to control a shift switching unit 16 (which is illustrated in FIG. 2) and the like. In FIG. 1, the vehicle 10 includes a shift switching unit 16, an electric actuator 17 that drives the shift switching unit 16, an automatic transmission 18, a shift operating unit 30, and an electronic control unit 32, and employs a shift-by-wire (SBW) system that electrically switches a shift position for switching a driving mode associated with traveling of the vehicle 10. The automatic transmission 18 is suitably used, for example, for a front-engine front-drive (FF) type vehicle in which the automatic transmission is horizontally arranged in the vehicle 10, and transmits power of an engine 12 which is an internal combustion engine as a driving force source for traveling from an output gear 22 as an output rotary member of the automatic transmission 18 constituting one of a counter gear pair 20 to a pair of driving wheels 14 sequentially via a counter gear pair 20 as a power transmission unit, a final gear pair 24, a differential gear mechanism (a differential gear) 26, a pair of axles (drive shafts (D/S)) 28, and the like. The automatic transmission 18, the counter gear pair 20, the final gear pair 24, the differential gear mechanism (the differential gear) 26, and the like constitute a transaxle (T/A). In the following description, an example in which the present disclosure is applied to a so-called engine vehicle including an engine 12 as a driving force source will be described, but a vehicle to which the present disclosure is applied may be any type of vehicle such as a hybrid vehicle, an electric vehicle, or a fuel-cell vehicle other than an engine vehicle as long as a shift-by-wire system is employed.

In FIG. 1, the electronic control unit 32 is configured to include a so-called microcomputer including a CPU, a RAM, a ROM, and input and output interfaces, and performs output control of the engine 12, gear shift control of the automatic transmission 18, and shift switching control of switching a driving mode in accordance with a command value from the shift operating unit 30 by performing a signal process in accordance with a program stored in advance in the ROM using a temporary storage function of the RAM.

The electronic control unit 32 is supplied with, for example, a shift lever position signal corresponding to an operation position Psh from a lever position sensor which is a position sensor that detects the operation position Psh of a shift lever 42, a P switch signal indicating a switch operation at a P switch 44 which is operated by a user and which switches the shift position of the automatic transmission 18 from a non-P position other than a parking position (P position) to the P position, an ignition key switch signal indicating a switching operation of an ignition key switch 46 which is operated by the user and which switches a power supply state of the vehicle 10, a wheel speed pulse signal corresponding to a vehicle speed V indicating a rotation speed $N_W$ of vehicle wheels (driving wheels 14 and driven wheels) from a vehicle speed sensor 48 as a rotation speed sensor, a signal indicating an accelerator depression amount Acc which is an operation amount of an accelerator pedal from an accelerator depression sensor, a brake operation signal indicating a brake ON state $B_{ON}$ from a brake switch 50, which indicates that a foot brake pedal which is not illustrated and which is for operating a service brake has been operated, a signal indicating a charging current or a discharging current $I_{CD}$ of a power storage unit 52 (a battery), a signal indicating a voltage $V_{BAT}$ of the power storage unit 52, a signal indicating a state of charge (a residual amount of charge) SOC of the power storage unit 52, an encoder signal Se indicating a degree of movement (a rotation angle) of an output shaft of an electric actuator 17 (which is illustrated in FIG. 2) that switches a manual valve from an incremental type rotary encoder 54 (which is illustrated in FIG. 2), a signal indicating a hydraulic pressure which is supplied to hydraulic frictional engagement elements which set each shift stage of the automatic transmission 18 from a hydraulic pressure sensor disposed in a hydraulic control circuit of the automatic transmission 18, and the like. The encoder signal Se is a pulse signal indicating a relative degree of movement.

The electronic control unit 32 includes an engine output control electronic control unit 34 (an engine control ECU), a gear shift control electronic control unit 36 (a gear shift control ECU), a shift switching control electronic control unit 38 (a shift-by-wire electronic control unit, SBW-ECU), and a meter electronic control unit 40 (a meter control ECU), and shift switching control is performed by the OW-ECU 38 in this embodiment. The engine control ECU 34, the gear shift control ECU 36, the SBW-ECU 38, and the meter control ECU 40 are supplied with power via power supply lines from the power storage unit 52, and transmit and receive information required for a variety of controls to and from each other via communication lines which are not illustrated.

The electronic control unit 32 switches a power supply switching state of the vehicle 10 based on the ignition key switch signal corresponding to a driver's operation of the ignition key switch 46.

The engine 12 includes a starter motor 58 that increases an engine rotation speed Ne until an autonomous operation is possible, that is, that cranks the engine 12, as an electric motor that drives the engine 12 with power supplied from the power storage unit 52. The engine control ECU 34 performs cranking control of cranking the engine 12 via the starter motor 58. The engine control ECU 34 supplies power from the power storage unit 52 to the starter motor 58 and cranks the engine 12 via the starter motor 58, by switching the starter relay 60 to an ON state when the switching state of the power supply of the vehicle 10 is set to a READY-ON state by the ignition key switch 46 in a brake-ON state. The ignition key switch 46 serves as a cranking operation unit that cranks the engine 12 by driving the starter motor 58 that is supplied with power from the power storage unit 52.

Here, the power storage unit 52 is a DC power supply that is chargeable and dischargeable and includes a secondary battery such as a lead storage battery, a nickel-hydride storage battery, or a lithium-ion battery. The power storage unit 52 serves as a power supply in the claims.

The gear shift control ECU 36 switches a shift stage to a target shift stage by controlling a hydraulic pressure supplied to hydraulic frictional engagement elements of a hydraulic control circuit based on a hydraulic pressure supplied to the hydraulic frictional engagement elements of the hydraulic control circuit from a hydraulic pressure sensor and a vehicle speed V from a vehicle speed sensor 48.

When a shift lever position signal indicating an operation position Psh of the shift lever 42 and being supplied from the shift operating unit 30 and a P switching signal based on an operation of a P switch 44 are acquired, the SBW-ECU 38 switches the shift switching unit 16 to the switching position corresponding to the signal indicating the operation position Psh or the P switch signal and switches the shift position of the automatic transmission 18. The SBW-ECU 38 controls the electric actuator 17 based on a degree of movement (a rotation angle) Pse acquired from the encoder signal Se of the encoder 54 such that a detent plate 74 rotates by a preset degree of movement for each switching position of the shift switching unit 16.

The meter control ECU 40 displays a current vehicle speed V on a display unit 62 based on the vehicle speed V output from the vehicle speed sensor 48. The meter control ECU 40 displays a current shift position of the automatic transmission 18 on the display unit 62 based on a shift position display signal of the automatic transmission 18 output from the SBW-ECU 38.

FIG. 1 illustrates an example of the shift operating unit 30 as a switching unit (an operation unit) that switches between a plurality of shift positions in the automatic transmission 18 by artificial operation. The shift operating unit 30 includes a shift lever 42 which is disposed, for example, in the vicinity of a driver seat and which is a momentary type operation unit that can be manipulated to a plurality of operation positions Psh, that is, an automatic return type manipulandum that automatically returns to an original position (an initial position) when an operating force is released. The shift operating unit 30 according to this embodiment includes a P switch 44, which is a momentary type manipulandum that locks the shift position of the automatic transmission 18 to a parking position (a P position), as a separate switch in the vicinity of the shift lever 42.

The shift lever 42 includes a momentary type mechanism that returns to a H position when it is not operated, is operated to an R operation position, an N operation position, and a D operation position which are three operation positions Psh arranged in the front-rear direction or the up-down direction of the vehicle 10, that is, the vertical direction and an H position and a B operation position which are arranged parallel thereto as illustrated in FIG. 1, and outputs a shift lever position signal corresponding to the operation position Psh to the SBW-ECU 38.

The P switch 44 is, for example, a momentary type push button switch and outputs a P switch signal to the SBW-ECU 38 whenever it is pushed by a user. For example, when the P switch 44 is pushed in a state in which the shift position of the automatic transmission 18 is located at a non-P position and a predetermined condition that the vehicle speed V is equal to or lower than a P-lock allowable vehicle speed Vp or the like is satisfied, the shift position is switched to the P position by the SBW-ECU 38. The P position is a parking position at which the power transmission path in the automatic transmission 18 is intercepted and parking lock of mechanically stopping rotation of the driving wheels 14 is performed by the shift switching unit 16 which also serves as a parking lock unit. A P position indicator lamp 64 is built into the P switch 44, and the P position indicator lamp 64 is turned on by the SBW-ECU 38 when the shift position of the automatic transmission 18 is the P position.

FIG. 2 is a perspective view illustrating the shift switching unit 16 that switches an operating state (locking or unlocking) of a mechanical parking lock mechanism 66 mechanically fixing rotation of the output gear 22 of the automatic transmission 18 or switches a position of a manual valve 68. In FIG. 2, the shift switching unit 16 includes a P lock mechanism (a parking lock mechanism) 66, an electric actuator 17, and an encoder 54, and is switched to one of a plurality of switching positions to restrict movement of the vehicle 10 and to switch the automatic transmission 18 to one of a plurality of shift positions, by driving the electric actuator 17 which is supplied with power from the power storage unit 52 based on a control signal from the SBW-ECU 38.

The electric actuator 17 is constituted, for example, by a switch reluctance motor (an SR motor) and drives the shift switching unit 16 using a shift-by-wire system in response to a command (a control signal) from the SBW-ECU 38. The electric actuator 17 is operated with power supplied from the power storage unit 52 which also supplies power to the starter motor 58.

The encoder 54 is, for example, a rotary encoder that outputs a signal of an A phase or a B phase, rotates integrally with the electric actuator 17, detects a rotation state of the SR motor, and supplies a signal indicating the rotation state, that is, a pulse signal for acquiring a count value (an encoder count value) corresponding to a degree of movement (a degree of rotation) of the electric actuator 17, to the SBW-ECU 38. The SBW-ECU 38 acquires the signal supplied from the encoder 54, detects the rotation state of the SR motor, and controls supply of power for driving the SR motor.

The P lock mechanism 66 is rotatably supported by a transaxle case Which is not illustrated and includes a shaft 72 that is rotationally driven by the electric actuator 17, a detent plate 74 that rotates together with rotation of the shaft 72, a rod 76 that moves with the rotation of the detent plate 74, a parking gear 78 that rotates together with the driving wheels 14, a parking lock pawl 80 that restricts (locks) rotation of the parking gear 78, a detent spring 82 that limits rotation of the detent plate 74 and fixes the shift position, and a roller 84. The parking gear 78 is fixed at a position in which the driving wheels 14 are locked when the parking gear is locked, for example, concentrically with the output gear 22 of the automatic transmission 18 (see FIG. 1).

Figure 3:
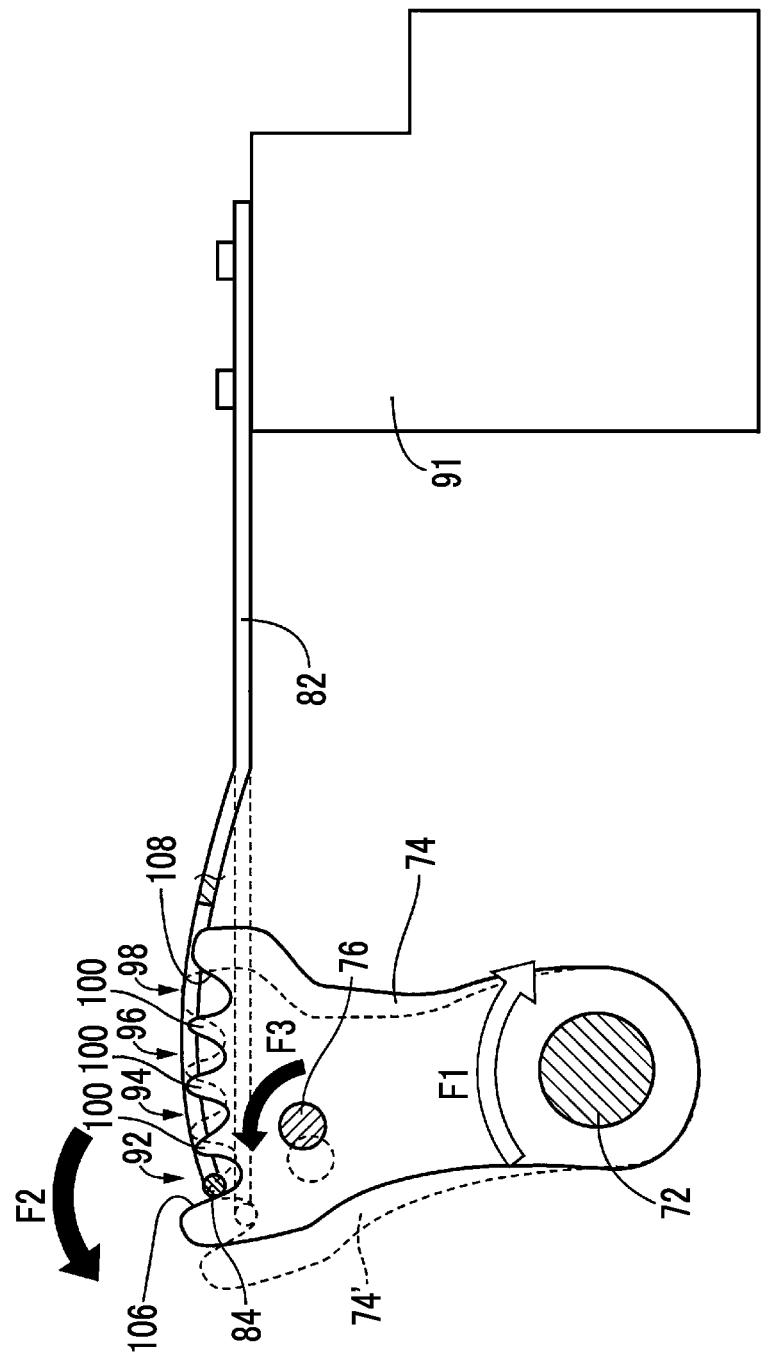
FIG. 3 is a diagram illustrating a control method of detecting a P-wall position of an electric actuator of the shift switching unit illustrated in FIG. 2.

The detent plate 74 is operationally connected to the shaft 72 which is driven by the electric actuator 17 and rotates integrally about the axis of the shaft 72. Unevenness including four valleys 86 is disposed at the top of the detent plate 74. As illustrated in FIG. 3, the four valleys 86 include a parking position 92 (a P position 92), a reverse position 94 (an R position 94), a neutral position 96 (an N position 96), and a drive position 98 (a D position 98). By causing the roller 84 to engage with one of the P position 92, the R position 94, the N position 96, and the D position 98 which are the valleys 86 disposed in the detent plate 74, the detent plate 74 is positioned in the rotation direction around the axis of the shaft 72, and the switching position of the shift switching unit 16 is switched. A spool valve piece 88 of the manual valve 68 is moved in an axial direction with the rotation of the detent plate 74 by causing a ring-shaped groove of a connecting member 104 to engage with a connecting pin 102 disposed upright from the detent plate 74, and switches a hydraulic oil path in the hydraulic control circuit of the automatic transmission 18 along the valleys 86 engaging with the roller 84. Accordingly, the automatic transmission 18 is switched to a shift position corresponding to the valley engaging with the roller 84 among the P position, the R position, the N position, and the D position corresponding to four switching positions in the shift switching unit 16. When the shift lever 42 is operated to the B operation position and the B position is selected, the roller 84 engages with the D position 98 of the detent plate 74. The roller 84 is disposed at a tip of the detent spring 82 attached to the top of a valve body 91 of the manual valve 68 to be rotatable about a support shaft parallel to the axis of the shaft 72, and is pushed upward to permit rotation of the detent plate 74 in FIG. 3 along the unevenness shape against a biasing force of the detent spring 82 when the detent plate 74 is rotationally driven by the electric actuator 17. FIG. 2 illustrates a state in which the roller 84 engages with the D position 98.

As illustrated in FIG. 2, when the roller 84 is located at the D position 98, that is, in a state in which the shift position is the D position, the parking lock pawl 80 does not lock the parking gear 78 and thus the rotation of the driving wheels 14 is not restricted by the P lock mechanism 66. When the shaft 72 is rotated in the direction of arrow C in FIG. 2 by the electric actuator 17 from this state, the rod 76 is pressed in the direction of arrow A in FIG. 2 via the detent plate 74, and the parking lock pawl 80 is pushed upward in the direction of arrow B in FIG. 2 by a taper member 90 disposed at the tip of the rod 76. With rotation of the detent plate 74, the roller 84 of the detent spring 82 located at the D position 98 (see FIG. 3) which is one of the fourth valleys 86 disposed at the top of the detent plate 74 passes over three mountains 100 and moves to the P position 92 (see FIG. 3) which is one of the four valleys 86. When the detent plate 74 rotates until the roller 84 is located at the P position 92, the parking lock pawl 80 is pushed up to the position at which it engages with the parking gear 78. Accordingly, rotation of the driving wheels 14 that rotate together with the parking gear 78 is mechanically restricted and an oil path of the hydraulic control circuit is switched to switch the shift position to the P position. In the shift switching unit 16, the switching position at which the roller 84 is located at the P position 92 is a locked position (the P position) at which rotation of the driving wheels (vehicle wheels) 14 is restricted, and the switching positions at which the roller 84 is located at the R position 94, the N position 96, and the D position 98 are non-locked positions (the non-P positions) at which rotation of the driving Wheels 14 is not restricted.

In FIG. 3, a P wall 106 is disposed at the P position 92 of the detent plate 74, and a D wall 108 is disposed at the D position 98. The P wall 106 serves as a rotation restricting element that restricts rotation of the shaft 72 fixed to the drive shaft of the electric actuator 17 in the direction of arrow C at the P position. The D wall 108 serves as a rotation restricting element that restricts rotation of the shaft 72 in the direction of arrow D at the D position. Rotation of the detent plate 74 in the direction of arrow C at the P-wall position at which the roller 84 butts the P wall 106 is restricted and rotation in the direction of arrow D at the D-wall position at which the roller 84 butts the D wall 108 is restricted. When the roller 84 moves, for example, from the P position 92 to the D position 98 via the R position 94 and the N position 96, the SBW-ECU 38 controls the electric actuator 17 such that the D wall 108 does not abut the roller 84. Specifically, the SBW-ECU 38 stops rotation of the electric actuator 17 at a position before the D wall 108 abuts the roller 84. This position is referred to as a "I) target rotational position." The D target rotational position is determined with a predetermined margin from the D-wall position, When the roller 84 moves, for example, from the D position 98 to the P position 92 via the N position 96 and the R position 94, the SBW-ECU 38 controls the electric actuator 17 such that the P wall 106 does not abut the roller 84. Specifically, the SBW-ECU 38 stops rotation of the electric actuator 17 at a position before the P wall 106 abuts the roller 84. This position is referred to as a "P target rotational position." The P target rotational position is determined by an encoder count value with respect to the P-wall position. As for the N position 96 and the R position 94, an N target rotational position and an R target rotational position are set based on the encoder count value with respect to the P-wall position.

In the shift switching unit 16 having the above-mentioned configuration, an encoder signal (a pulse signal) Se output from the encoder 54 is counted by a counter in the SBW-ECU 38, and an encoder count value (a count value) corresponding to the degree of rotation of the electric actuator 17 is generated, The SBW-ECU 38 controls the electric actuator 17 such that the acquired encoder count value reaches a preset target encoder count value (a target count value).

A correlation between the degree of rotation of the electric actuator 17 and the shift position has been described above. The encoder 54 is a relative position sensor and the SBW-ECU 38 loses information on the absolute position of the electric actuator 17, for example, the P-wall position and the D-wall position, in a non-started state. Accordingly, when the SBW-ECU 38 is switched from the non-started state to a started state, the SBW-ECU 38 needs to detect the absolute position of the electric actuator 17. A method of performing P-wall position setting control (setting of a reference position) of the electric actuator 17 using the encoder 54 that detects relative position information will be specifically described below with reference to FIGS. 3 to 5. Here, examples of the case in which the SBW-ECU 38 is switched from the non-started state to the started state include a case in which the power supply state of the vehicle 10 is switched from an ALL-OFF state or an ACC-ON state to an IG-ON state or a READY-ON state and a case in which an instantaneous interruption in which the supply of power of the SBW-ECU 38 is instantaneously interrupted occurs.

Figure 4:
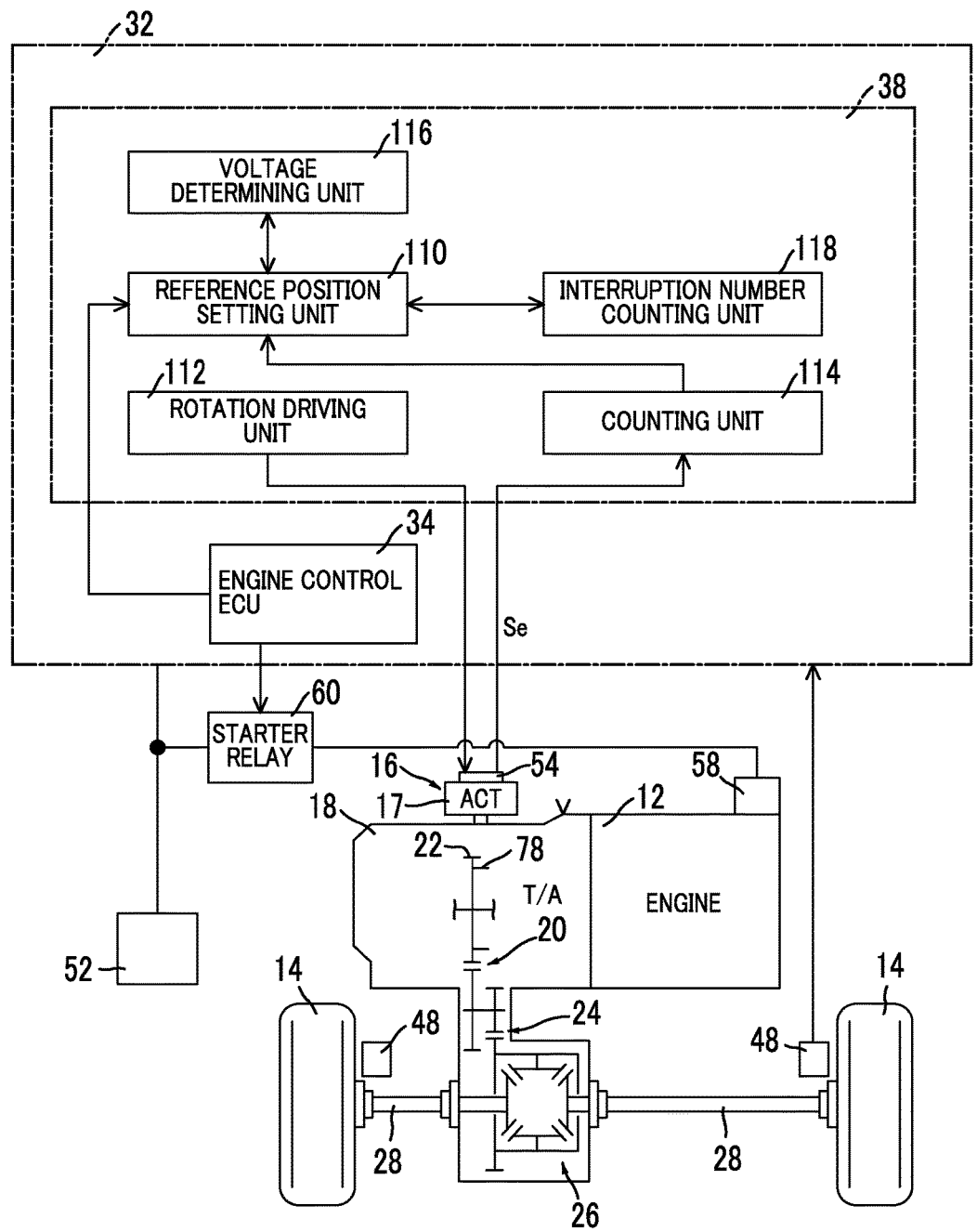
FIG. 4 is a functional block diagram illustrating a principal part of a control function of an SBW-ECU that controls the shift switching unit illustrated in FIG. 2.

FIG. 3 is a diagram illustrating a control method of detecting the P-wall position of the electric actuator 17. FIG. 4 is a functional block diagram illustrating a principal part of a control function when the SBW-ECU 38 sets the reference position of the electric actuator 17. As illustrated in FIG. 4, the SBW-ECU 38 includes a reference position setting unit 110, a rotation driving unit 112, a counting unit 114, a voltage determining unit 116, and an interruption number counting unit 118.

Figure 5:
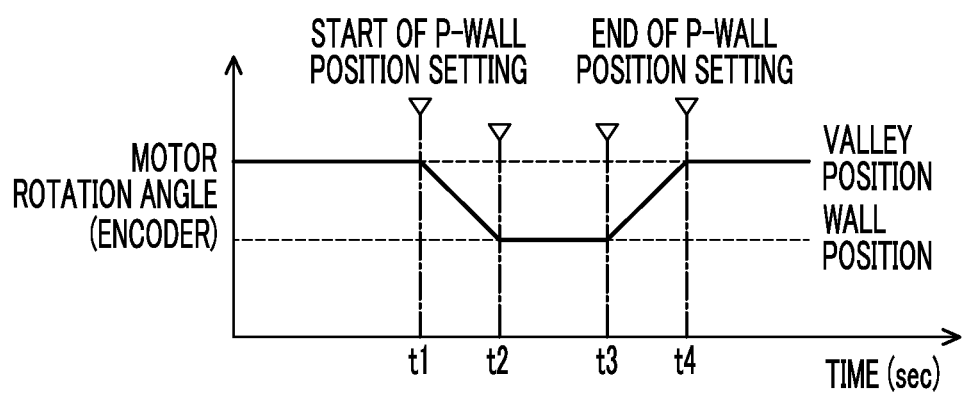
FIG. 5 is a timing chart illustrating a rotation angle of the electric actuator (a motor rotation angle) which is detected by an encoder from a start to an end of P-wall position setting control by the SBW-ECU illustrated in FIG. 4.

FIG. 5 is a timing chart illustrating a rotation angle of the electric actuator 17 (a motor rotation angle) which is detected by the encoder 54 in the P-wall position setting control by the SBW-ECU 38 in the shift switching unit 16. The rotation driving unit 112 of the SBW-ECU 38 rotates the electric actuator 17 with power supplied from the power storage unit 52. The counting unit 114 of the SBW-ECU 38 counts the pulse signal Se corresponding to the degree of rotation of the electric actuator 17 from the encoder 54 and outputs the encoder count value.

When the SBW-ECU 38 is switched from the non-started state to the started state, the reference position setting unit 110 of the SBW-ECU 38 starts the P-wall position setting control. The P-wall position setting control includes P-wall position detection control and P-wall return control. The P-wall position detection control is control of detecting the P-wall position (the reference position) of the electric actuator 17 corresponding to the P position based on the rotational position of the electric actuator 17 when the encoder count value does not vary by restricting rotation of the electric actuator 17 in the direction of arrow C in FIG. 2 using the P wall 106. The P-wall return control is control which is performed subsequent to the end of the P-wall position detection control regardless of whether the P-wall position is set and is control of returning the electric actuator 17 such that the encoder count value reaches an encoder count value at a start time point of the P-wall position detection control, that is, at a rotation start point of the electric actuator 17. The reference position setting unit 110 first drives the electric actuator 17 via the rotation driving unit 112 such that the detent plate 74 is rotated in the direction of arrow C in FIG. 2, that is, in a direction in which the P wall 106 faces the roller 84 of the detent spring 82, and the roller 84 located at the valley position in FIG. 5 is brought into contact with the P wall 106 at the P position of the detent plate 74 at the start time point of the P-wall position detection control (time point t1 in FIG. 5) (a predetermined time point (not illustrated) between time point t1 and time point t2 in FIG. 5). The P wall 106 serves as a rotation restricting element that restricts rotation of the electric actuator 17 in the direction of arrow C in FIG. 2 as the predetermined direction at the P position. In FIG. 3, arrow F1 denotes a rotating force of the electric actuator 17, arrow F2 denotes a spring force of the detent spring 82, and arrow F3 denotes a pushing-back force of the rod 76. The detent plate 74' indicated by a dotted line denotes a state in which the roller 84 is located at the valley position in FIG. 5, for example, the P target rotational position, at the P position 92 at the start time point of the P-wall position detection control.

The reference position setting unit 110 outputs a rotating force F1 as a predetermined torque to the electric actuator 17 via the rotation driving unit 112 even after the P wall 106 and the roller 84 come into contact with each other, and causes the detent plate 74 to rotate in the direction of arrow C in FIG. 2 against the spring force of the detent spring 82 while causing the P wan 106 to abut the roller 84. When the P wall 106 is in contact with the roller 84 and rotation of the electric actuator 17 is restricted by the P wall 106, deflection occurs in the detent spring 82, the spring force F2 increases with the rotation of the detent plate 74 in the direction of arrow C, and a pushing-back force F3 from the rod 76 also increases. Since rotation of the electric actuator 17 is restricted by the P wall 106, rotation of the detent plate 74 stops when the rotating three F1 is balanced with the spring force F2 and the pushing-back force F3 (time point t2 in FIG. 5). A rotation stop state in which rotation of the detent plate 74 stops by causing the P wall 106 to abut the roller 84 of the detent spring 82 is referred to as an abutting state of the P wall 106 (a P-wall abutting state). The rotation stop state in which rotation of the detent plate 74 stops between time point t2 and time point t3 in FIG. 5, that is, the abutting state of the P wall 106, is indicated as the detent plate 74 in a solid line in FIG. 3.

The reference position setting unit 110 of the SBW-ECU 38 determines whether to stop rotation of the detent plate 74 in the abutting state in which the P wall 106 abuts the roller 84 based on non-variation of the encoder count value acquired from the counting unit 114. For example, the reference position setting unit 110 determines that rotation of the detent plate 74 and the electric actuator 17 should be stopped when a minimum value or a maximum value of the encoder count value does not vary over a predetermined time (between time point t2 and a predetermined time point (not illustrated) between time point t2 and time point t3 in FIG. 5). Which of the minimum value and the maximum value of the encoder count value should be monitored can be set depending on a counting direction of the encoder count value, and a state in which the minimum value or the maximum value of the encoder count value does not vary over the predetermined time in either case denotes a state in which the detent plate 74 does not move. In this embodiment, rotation stop of the detent plate 74 and the electric actuator 17 in the P-wall position detection control is determined based on non-variation of the minimum value of the encoder count value over the predetermined time.

The reference position setting unit 110 detects a position of the detent plate 74 at the time of rotation stop (the wall position in FIG. 5) as an interim P-wall position (hereinafter referred to as an "interim P-wall position"), and calculates an amount of deflection or an angle of deflection of the detent spring 82. The calculation of an amount of deflection or an angle of deflection is performed, for example, using a map indicating a relationship of the amount of deflection or the angle of deflection corresponding to an application voltage (supply voltage Vmr) to the electric actuator 17, which is stored in the SBW-ECU 38 in advance. The reference position setting unit 110 calculates the amount of deflection or the angle of deflection corresponding to the application voltage to the electric actuator 17 at the time of detecting the interim P-wall position from the map. The map may be a map using a voltage Vbat of the power storage unit 52 instead of the application voltage of the electric actuator 17. The voltage Vbat of the power storage unit 52 is monitored by the SBW-ECU 38 and can be easily detected. In this case, the map is prepared in consideration of a voltage drop due to a wire harness or the like from the power storage unit 52 to the electric actuator 17.

The reference position setting unit 110 corrects the interim P-wall position based on the amount of deflection or the angle of deflection calculated using the map, sets the corrected position as the P-wall position, and ends (completes) the P-wall position detection control. The P-wall position is a reference position of the electric actuator 17 corresponding to the P position. At this time, the reference position setting unit 110 sets the encoder count value at the set P-wall position to a predetermined CNTP value (a negative value). Then, the reference position setting unit 110 performs the P-wall return control of returning the position of the detent plate 74 from the wall position in FIG. 5 (the interim P-wall position) to the valley position (see FIGS. 7 to 10) via the rotation driving unit 112 such that the encoder count value becomes zero. Specifically, the reference position setting unit 110 rotates the detent plate 74 in the direction of arrow D in FIG. 2, that is, in the direction in which the P wall 106 is separated away from the roller 84 of the detent spring 82 (from a predetermined time point between time point t2 and time point t3 to time point t4 in FIG. 5) and returns the position of the detent plate 74 from the interim P-wall position to a predetermined P position (the valley position in FIG. 5) at the start time point (time point t1 in FIG. 5) of the P-wall position setting control (time point t4 in FIG. 5), by driving the electric actuator 17 using the rotation driving unit 112 such that the encoder count value (a negative value) increases to zero by the CNTP value. The position of the detent plate 74 becomes the predetermined P position and the P-wall position setting control (the P-wall return control) ends (time point t4 in FIG. 5). The predetermined P position is set in advance such that the difference between the set P-wall position and the predetermined P position is the encoder count value and is the CNTP value. The predetermined P position may be set as the P target rotational position.

The switching state of the power supply may be switched from the ALL-OFF state to the READY-ON state by a driver's operation of the ignition key switch 46. In this case, cranking control of the engine 12 is performed in parallel with the reference position detection control, and there is a likelihood that the voltage supplied from the power storage unit 52 to the electric actuator 17 for cranking the engine 12 will decrease or vary. Accordingly, there is a likelihood that a sufficient torque for causing the P wall 106 of the detent plate 74 to abut the roller 84 in the reference position detection control will not be output from the electric actuator 17, the interim P-wall position will not be determined with high accuracy or the amount of deflection or the angle of deflection of the detent spring 82 will not be calculated with high accuracy, and thus the P-wall position will not be set with high accuracy.

When the SBW-ECU 38 is switched from the non-started state to the started state, the voltage determining unit 116 sequentially detects the supply voltage Vmr supplied to the electric actuator 17 (an electric actuator supply voltage Vmr) and determines whether the electric actuator supply voltage Vmr is equal to or greater than a predetermined first supply voltage determination value V1mr. The first supply voltage determination value V1mr is a preset lower limit of the electric actuator supply voltage Vmr with which a predetermined torque to be output from the electric actuator 17 is compensated for in the abutting state in order to accurately set the P-wall position in the P-wall position detection control of the electric actuator 17.

When the voltage determining unit 116 determines that the electric actuator supply voltage Vmr is equal to or less than the first supply voltage determination value V1mr in the P-wall abutting state in which rotation of the electric actuator 17 in the P-wall position detection control is restricted by the P wall 106, the reference position setting unit 110 determines that detection of the P-wall position has failed in the P-wall position detection control, stops the P-wall position setting control, switches a P-wall position detection failure flag from OFF to ON, and ends the P-wall position detection control. Here, when the P-wall position detection control ends without setting the P-wall position in the P-wall position detection control and the P-wall return control is performed, this is referred to as interruption of the P-wall position setting control.

The reference position setting unit 110 determines whether a variation in the rotational position (a motor position) of the electric actuator 17 is equal to or greater than a predetermined variation based on whether the variation in the minimum value or the maximum value of the encoder count value from the counting unit 114 is equal to or greater than a predetermined value in the P-wall abutting state in which rotation of the electric actuator 17 is restricted by the P wall 106 in the P-wall position detection control. The variation in the rotational position of the electric actuator 17 in the P-wall abutting state is a displacement which is generated in the rotational position in the return direction of the electric actuator 17 in the P-wall abutting state because the torque acting on the detent plate 74 is insufficient due to deficiency of the supply voltage to the electric actuator 17, and the predetermined variation is set in advance as an upper limit of a range of the variation in the rotational position of the electric actuator 17 in which a predetermined torque required for accurately setting the P-wall position is guaranteed to be output from the electric actuator 17. For example, when it is determined that the variation in the rotational position of the electric, actuator 17 is equal to or greater than the predetermined variation based on the fact that a maximum range of the variation in the minimum value or the maximum value of the encoder count value is equal to or greater than the predetermined value, the reference position setting unit 110 determines that the P-wall position detection has failed in the P-wall position setting control, stops the P-wall position detection control, and switches the P-wall position detection failure flag from OFF to ON.

In the P-wall abutting state in which rotation of the electric actuator 17 is restricted by the P wall 106 in the P-wall position detection control, the reference position setting unit 110 determines whether a degree of rotation of the electric actuator 17 (a rotation angle of the detent plate 74) from the start time of the P-wall position detection control, that is, the rotation start time of the electric actuator 17, to the end (completion) of the P-wall position detection control is equal to or less than a predetermined degree of rotation regardless of whether the P-wall position of the electric actuator 17 is set based on whether the variation of the encoder count value from the start time of the P-wall position detection control to a time point at which the encoder count value does not vary is equal to or less than a predetermined variation B of the encoder count value. When it is determined that the degree of rotation of the electric actuator 17 from the rotation start time of the electric actuator 17 to the end time of the P-wall position detection control, that is, a time point at which rotation stop of the electric actuator 17 is determined, is equal to or less than a predetermined degree of rotation based on the fact that a difference between the encoder count value at the rotation start time of the electric actuator 17 and the encoder count value in the state in which the encoder count value does not vary is equal to or less than the predetermined variation B, the reference position setting unit 110 determines that detection of the P-wall position has failed, stops the P-wall position setting control, and switches the P-wall position detection failure flag from OFF to ON. Here, the variation B of the encoder count value is a lower limit of the variation in a range in which a predetermined rotation angle for reaching the P-wall position is guaranteed to be acquired by the electric actuator 17 in the P-wall position detection control of the electric actuator 17 and is set in advance.

When it is not determined in the P-wall abutting state that the electric actuator supply voltage Vmr is equal to or less than the first supply voltage determination value V1$mr$, it is not determined that the variation in the minimum value or the maximum value of the encoder count value is equal to or greater than the predetermined value, and it is not determined that the difference (the variation in the encoder count value) between the encoder count value at the start time of the P-wall position detection control, that is, at the rotation start time of the electric actuator 17, and the encoder count value in the state in which the encoder count value does not vary is equal to or less than the predetermined variation B, the reference position setting unit 110 performs the P-wall return control after setting the P-wall position in the P-wall position detection control.

The interruption number counting unit 118 increases a wall position detection failure counter whenever the P-wall position setting control (setting of the reference position) is interrupted by the reference position setting unit 110 and the P-wall position detection failure flag is switched from OFF to ON, that is, whenever driving of the electric actuator 17 is stopped without setting the P-wall position when the P-wall position setting control is interrupted. Here, the stop of driving of the electric actuator 17 means that driving of the electric actuator 17 is temporarily stopped until the P-wall position setting control is restarted after the encoder count value is returned to the encoder count value at the rotation start time of the electric actuator 17 by the P-wall return control when the P-wall position setting control is interrupted. The interruption number counting unit 118 determines whether a detection failure frequency of the P-wall position (the wall position detection failure counter) is less than an allowable failure frequency. Here, the allowable failure frequency is a lower limit of the P-wall position detection failure frequency in which there is a likelihood that responsiveness to a start request from a driver or the like will decreases because a shift position switching request of the automatic transmission 18 due to the driver's operation of the shift operating unit 30 is not accepted because the P-wall position setting control is repeated, and is determined in advance. An example of the allowable failure frequency is preferable two. When the allowable failure frequency is set to two, the P-wall position setting control is allowed to be restarted only one time.

When the reference position setting unit 110 determines that detection of the P-wall position fails, the voltage determining unit 116 determines whether the electric actuator supply voltage Vmr is lower than a second supply voltage determination value V2$mr$ for determining a possibility of retrial (that the P-wall position setting control will be restarted). Here, the second supply voltage determination value V2$mr$ is set to a value higher than the first supply voltage determination value V1$mr$.

The engine control ECU 34 outputs a signal indicating Whether the engine 12 is cranked by driving the starter motor 58 to the reference position setting unit 110. The reference position setting unit 110 determines whether the engine 12 is cranked based on whether the signal is received from the engine control ECU 34. Alternatively, the reference position setting unit 110 may determine whether the engine 12 is cranked based on whether the supply voltage to the starter motor 58 is higher than a predetermined voltage determination value.

When it is determined that the detection failure frequency of the P-wall position reaches the allowable failure frequency after the P-wall position setting control is interrupted, the reference position setting unit 110 does not restart the P-wall position setting control but ends the P-wall position setting control. When the encoder count value is returned to the encoder count value at the start time of the P-wall position detection control after the P-wall position setting control is interrupted, the interruption number counting unit 118 determines that the detection failure frequency of the P-wall position is less than the allowable failure frequency, and the voltage determining unit 116 determines that the electric actuator supply voltage Vmr is equal to or higher than the second supply voltage determination value V2$mr$, the reference position setting unit 110 restarts the P-wall position setting control. When the encoder count value is returned to the encoder count value at the start time of the P-wall position detection control after the P-wall position setting control is interrupted, the interruption number counting unit 118 determines that the detection failure frequency of the P-wall position is less than the allowable failure frequency, and it is determined that the engine 12 is not cranking based on a signal from the engine control ECU 34, the reference position setting unit 110 restarts the P-wall position setting control. The reference position setting unit 110 switches the P-wall position detection failure flag from ON to OFF after a predetermined time passes from the restarting time of the P-wall position setting control, When the encoder count value is returned to the encoder count value at the start time of the P-wall position detection control after the P-wall position setting control is interrupted, the voltage determining unit 116 determines that the electric actuator supply voltage Vmr is less than the second supply voltage determination value V2$mr$, and it is determined that the engine 12 is cranked based on a signal from the engine control ECU 34, the reference position setting unit 110 switches a low-voltage standby flag from OFF to ON. The reference position setting unit 110 measures a time elapsing after the low-voltage standby flag is switched from OFF to ON as a standby time Tw (a retrial standby time Tw of the P-wall position setting control) in which the P-wall position setting control is not restarted and is waited for from the transition time to the wall abutting retrial, The retrial standby time Tw is a time elapsing from the time point at which the encoder count value is returned to the encoder count value at the start time of the P-wall position detection control after the P-wall position setting control is interrupted, that is, the time point of transition to the wall abutting retrial and is a standby time in which the P-wall position setting control is not restarted but is waited for because the electric actuator supply voltage Vmr is less than the second supply voltage determination value V2$mr$ and the engine 12 is cranked. The reference position setting unit 110 determines whether the retrial standby time Tw of the P-wall position setting control is equal to or greater than a predetermined time T1. When it is determined that the retrial standby time Tw of the P-wall position setting control is equal to or greater than the predetermined time T1, the reference position setting unit 110 does not restart but ends the P-wall position setting control. In brief, when the state in which the electric actuator supply voltage Vmr is lower than the second supply voltage determination value V2$mr$ is maintained over the predetermined time T1 or more and the state in which the engine 12 is cranked is maintained over the predetermined time T1 or more from the time point at which the encoder count value is returned to the encoder count value at the start time of the P-wall position detection control after the P-wall position setting control is interrupted, the reference position setting unit 110 does not restart but ends the P-wall position setting control. In other words, when the retrial standby time Tw from the time point at which the encoder count value is returned to the encoder count value at the start time of the P-wall position detection control after the P-wall position setting control is interrupted is less than the predetermined time T1 and the electric actuator supply voltage Vmr is changed from a value lower than the second supply voltage determination value V2$mr$ to a value equal to or higher than the second supply voltage determination value V2$mr$ or when the cranking of the engine 12 ends, the reference position setting unit 110 restarts setting the P-wall position of the electric actuator 17.

Figure 6:
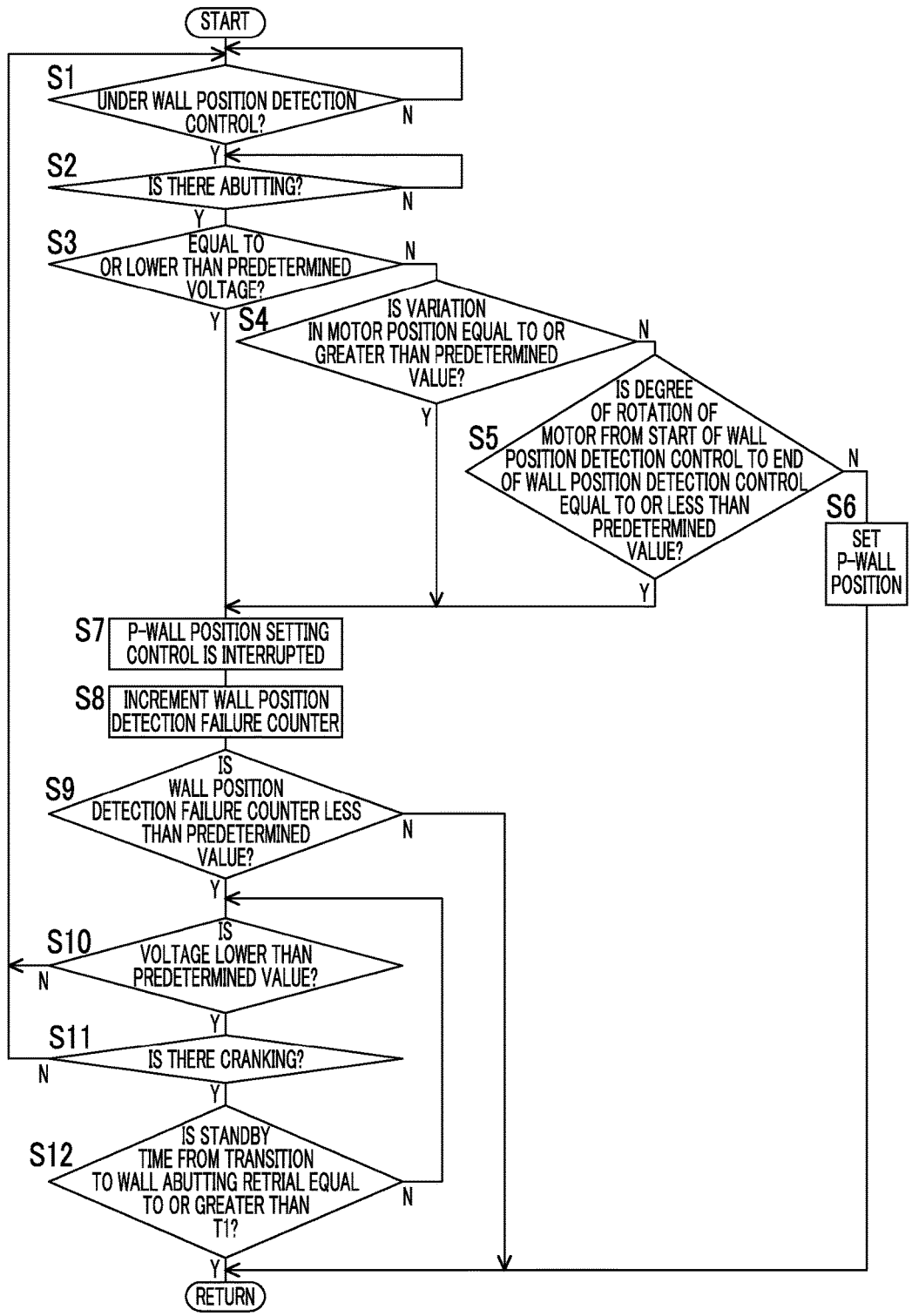
FIG. 6 is a flowchart illustrating a principal part of a control operation in the P-wall position setting control by the SBW-ECU illustrated in FIG. 4.
Figure 7:
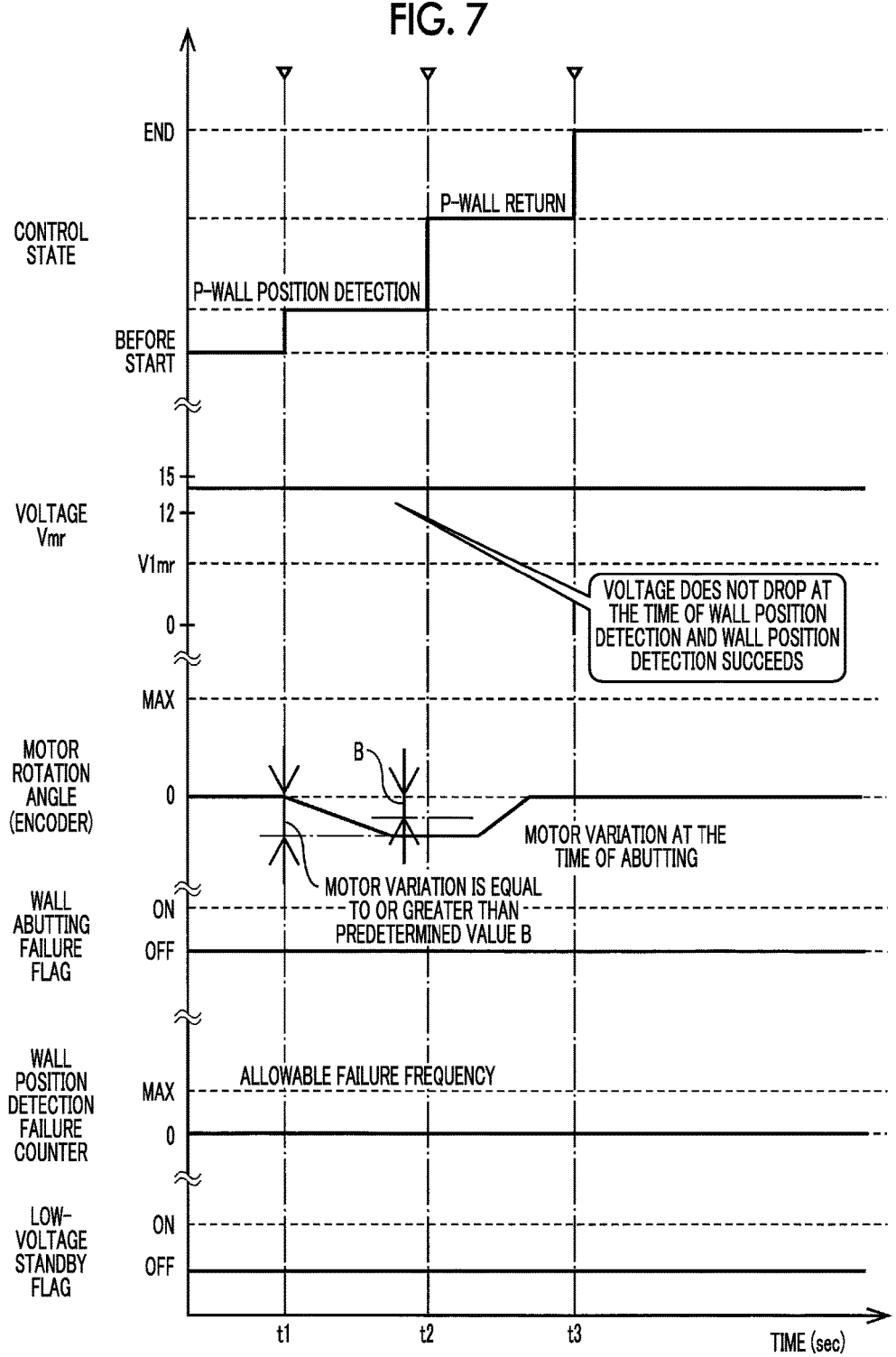
FIG. 7 is a timing chart illustrating an example of a control operation in the P-wall position setting control by the SBW-ECU illustrated in FIG. 4 when the SBW-ECU is switched from a non-started state to a started state due to switching of a power supply state of the vehicle to an IG-ON state.
Figure 8:
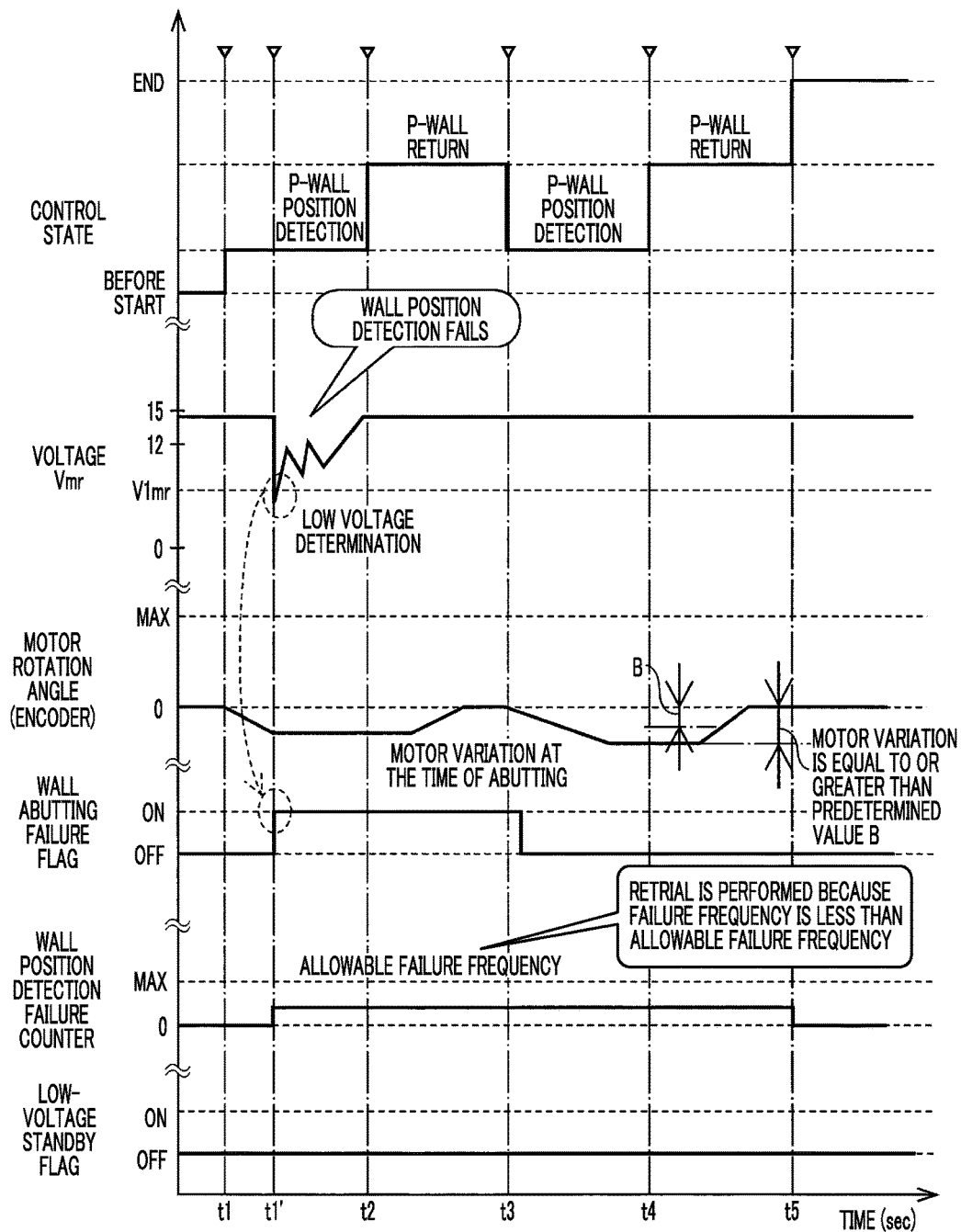
FIG. 8 is a timing chart illustrating an example of a control operation in the P-wall position setting control by the SBW-ECU illustrated in FIG. 4 when the SBW-ECU is switched from a non-started state to a started state due to switching of a power supply state of the vehicle to a READY-ON state.
Figure 9:
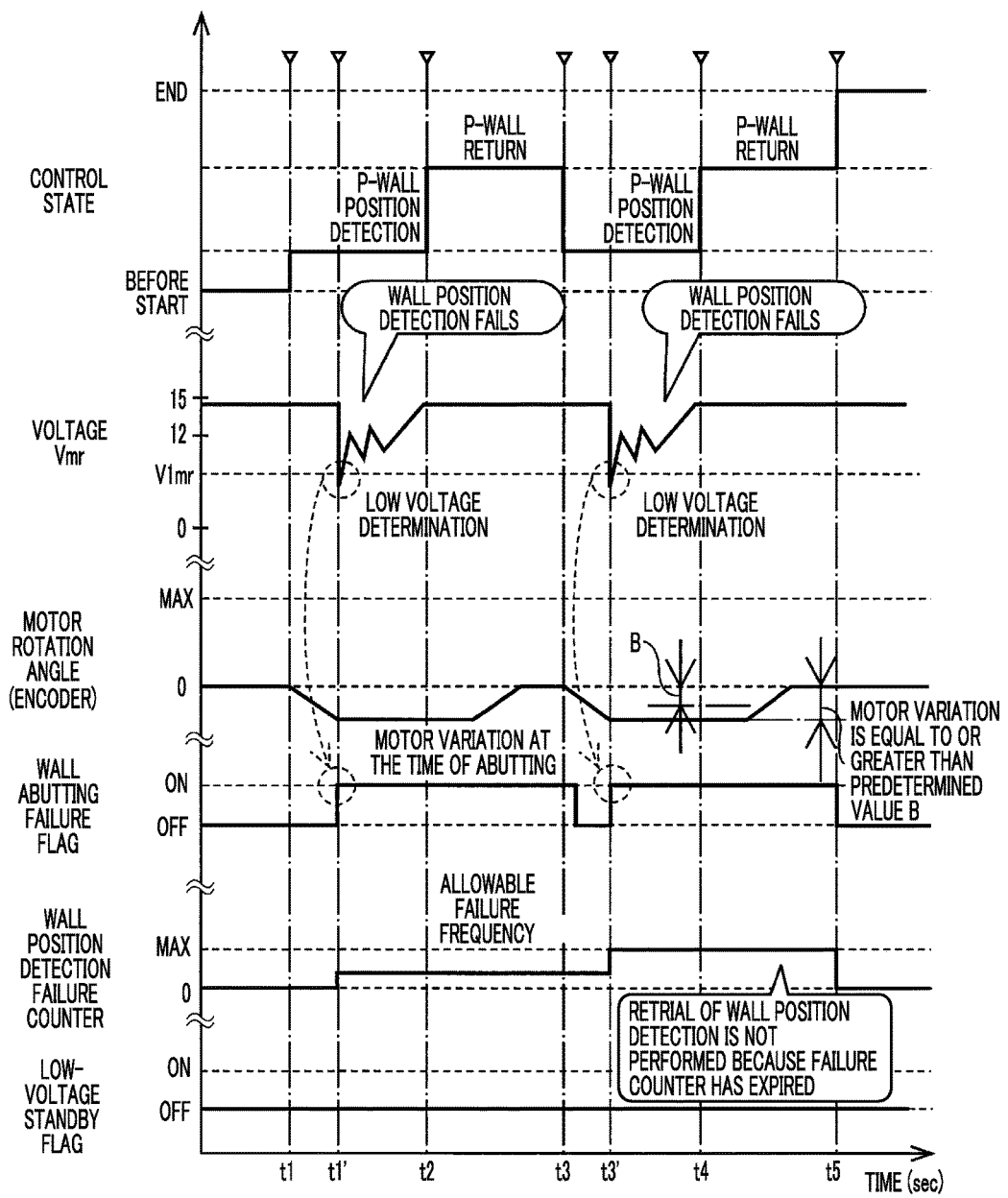
FIG. 9 is a timing chart illustrating an example of a control operation in the P-wall position setting control by the SBW-ECU illustrated in FIG. 4 when the SBW-ECU is switched from a non-started state to a started state due to switching of a power supply state of the vehicle to a READY-ON state.
Figure 10:
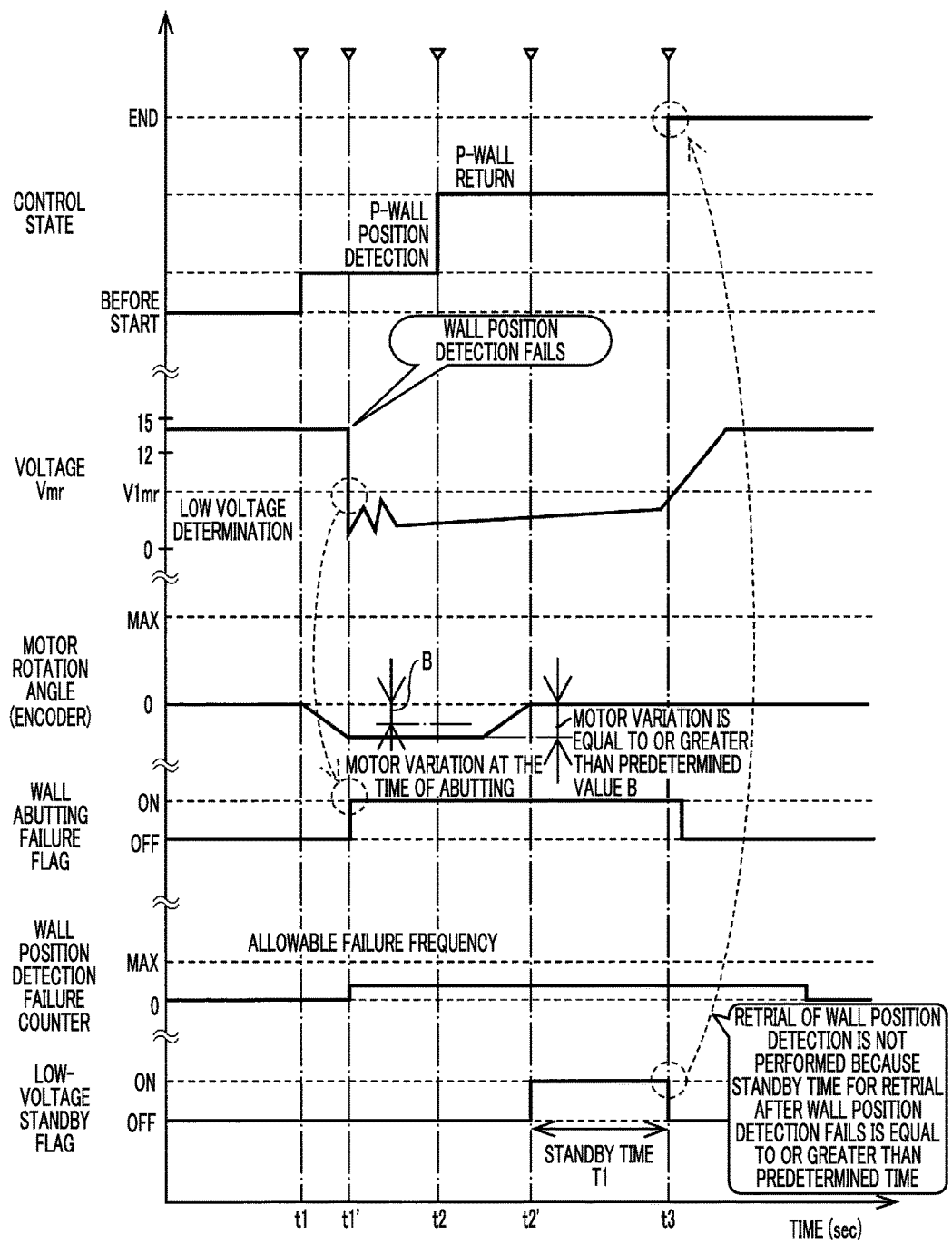
FIG. 10 is a timing chart illustrating an example of a control operation in the P-wall position setting control by the SBW-ECU illustrated in FIG. 4 when the SBW-ECU is switched from a non-started state to a started state due to switching of a power supply state of the vehicle to a READY-ON state.

FIG. 6 is a flowchart illustrating a principal part of the P-wall position detection control in the P-wall position setting control of the SBW-ECU 38. FIG. 7 is a timing chart illustrating an example of the control operation of the P-wall position setting control by the SBW-ECU 38 when the power supply state of the vehicle 10 is changed to an IG-ON state. FIGS. 8 to 10 are timing charts illustrating examples of the control operation of the P-wall position setting control by the SBW-ECU 38 when the power supply state of the vehicle 10 is changed to a READY-ON state.

In FIG. 6, in Step (hereinafter "Step" is omitted) S1, it is determined whether the P-wall position detection control is being performed. When the determination result of S1 before time point t1 in FIGS. 7 to 10 is negative, S1 is performed again. When the determination result of S1 before time point t1 in FIGS. 7 to 10 is positive, it is determined in S2 corresponding to the function of the reference position setting unit 110 whether it is in the P-wall abutting state which is the rotation stop state in which rotation of the detent plate 74 is stopped because rotation of the electric actuator 17 is restricted by the P wall 106. When a variation of the encoder count value from time point t1 which is the start time point of the P-wall position detection control is equal to or greater than a preset abutting determination value, for example, the CNTP value, it is determined that it is in the P-wall abutting state in the P-wall position detection control. When the determination result of S2 is negative, S2 is performed again. When the determination result of S2 is positive, it is determined in S3 corresponding to the function of the voltage determining unit 116 whether the electric actuator supply voltage Vmr in the P-wall abutting state is equal to or lower than the first supply voltage determination value V1$mr$. When the determination result of S3 is negative, it is determined in S4 corresponding to the function of the reference position setting unit 110 whether the variation of the rotational position of the electric actuator 17 in the P-wall abutting state is equal to or greater than a predetermined variation based on whether the variation in the minimum value or the maximum value of the encoder count value in the P-wall abutting state is equal to or greater than a predetermined variation. When the determination result of S4 is negative, it is determined in S5 corresponding to the function of the reference position setting unit 110 whether the degree of rotation of the electric actuator 17 from the start of the P-wall position detection control to the end (completion) of the P-wall position detection control is equal to or lower than a predetermined degree of rotation based on whether the variation in the encoder count value from the start time of the P-wall position detection control, that is, the rotation start time of the electric actuator 17, to the state in which the encoder count value does not vary is equal to or less than a predetermined variation B in the encoder count value. When the determination result of S5 is negative, the P-wall position of the electric actuator 17 is set in the P-wall position detection control in S6 corresponding to the function of the reference position setting unit 110, and the P-wall return control is performed after the P-wall position detection control ends. This flowchart ends after S6 is performed. In FIG. 7, since the cranking of the engine 12 is not performed when the power supply state of the vehicle 10 is the IG-ON state, the cranking control of the engine 12 is not performed at the same time as the P-wall position detection control. Accordingly, since the electric actuator supply voltage Vmr does not decrease in the abutting state of the P-wall position detection control and the variation in the encoder count value from the start time point (time point t1 in FIG. 7) of the P-wall position detection control up to the state in which the encoder count value does not vary is greater than the predetermined variation B in the encoder count value, the P-wall position is set at time point t2 at which a predetermined time has passed after the state in which the encoder count value does not vary, the P-wall position detection control is ended, and the P-wall return control is started. When a predetermined time passes after the encoder count value is returned to the same value as at the start time point (time point t1 in FIG. 7) of the P-wall position detection control, the P-wall return control is ended and the P-wall position setting control is ended.

When the determination result of one of S3, S4, and S5 is positive, the P-wall position setting control is interrupted in S7 corresponding to the function of the reference position setting unit 110. That is, the P-wall position detection control is ended without setting the P-wall position of the electric actuator 17, and the P-wall return control is performed. In S8 corresponding to the function of the interruption number counting unit 118, the P-wall position detection failure frequency (the P-wall position detection failure counter) is counted up (increased). In FIGS. 8 to 10, the electric actuator supply voltage Vmr is equal to or lower than the first supply voltage determination value V1$mr$ at time point t1' due to a decrease (a variation) of the electric actuator supply voltage Vmr resulting from the cranking of the engine 12 in the P-wall abutting state of the P-wall position detection control, the P-wall position detection failure flag (a wall abutting failure flag) is switched from OFF to ON, and the wall position detection failure counter is increased from 0 to 1. The P-wall return control is started without setting the P-wall position in the P-wall position detection control due to the interruption of the P-wall position setting control (time point t2 in FIGS. 8 to 10). In S9 corresponding to the function of the interruption number counting unit 118, it is determined whether the P-wall position detection failure frequency (the P-wall position detection failure counter) is less than an allowable failure frequency. When the determination result of S9 is negative, that is, when it is determined that the P-wall position detection failure frequency reaches the allowable failure frequency, the P-wall position setting control is ended without restarting the P-wall position setting control and this flowchart ends. When the determination result of S9 is positive, it is determined in S10 corresponding to the function of the voltage determining unit 116 whether the electric actuator supply voltage Vmr is less than the second supply voltage determination value V2mr. When the determination result of S10 is negative, S1 is performed again and the P-wall position setting control is restarted. When the determination result of S10 is positive, it is determined in S11 corresponding to the function of the reference position setting unit 110 whether the engine 12 is cranked, for example, based on the supply voltage to the starter motor 58. When the determination result of S11 is negative, S1 is performed again and the P-wall position setting control is restarted. When the determination result of S11 is positive, it is determined in S12 corresponding to the function of the reference position setting unit 110 whether the retrial standby time Tw of the P-wall position setting control, that is, the standby time Tw in which the P-wall position setting control is not restarted but is waited for because the electric actuator supply voltage Vmr is less than the second supply voltage determination value and the engine 12 is cranked from a time point of transition to wall abutting retrial, is equal to or greater than a predetermined time T1. When the determination result of S12 is negative, S10 is performed again. When the determination result of S12 is positive, this flow chart ends without restarting the P-wall position setting control.

In FIGS. 8 and 9, when the encoder count value is returned to the encoder count value at the start time point of the P-wall position detection control (time point t1 in FIGS. 8 and 9) by the P-wall return control after the P-wall position setting control is interrupted, the wall position detection failure counter is one which is less than the allowable failure frequency (two in maximum) and the electric actuator supply voltage Vmr is equal to or greater than the second supply voltage determination value V2mr.

Accordingly, the P-wall position setting control is restarted (time point t3 in FIGS. 8 and 9) and the P-wall position detection failure flag is switched from ON to OFF when a predetermined time passes after the P-wall position setting control is restarted. In FIG. 8, the P-wall position is set by the second P-wall position detection control (time point t4 in FIG. 8) and the P-wall position setting control ends (time point t5 in FIG. 8). On the other hand, in FIG. 9, in the P-wall abutting state in the second P-wall position detection control, the electric actuator supply voltage Vmr is equal to or less than the first supply voltage determination value V1mr, the P-wall position detection failure flag is switched from OFF to ON, and the wall position detection failure counter is increased (time point t3' in FIG. 9). Then, the P-wall return control is started without setting the P-wall position in the P-wall position detection control by the interruption of the P-wall position setting control (time point t4 in FIG. 9). When the encoder count value is returned to the encoder count value at the start time point of the P-wall position detection control and transitions to the wall abutting retrial, it is determined that the P-wall position detection failure counter reaches two which is the allowable failure frequency and the P-wall position setting control is not restarted but is ended (time point t5 in FIG. 9).

In FIG. 10, at time point t2' at Which the encoder count value is returned to the encoder count value at the start time point of the P-wall position detection control and transitions to the wall abutting retrial by the P-wall return control, since the electric actuator supply voltage Vmr is less than the second supply voltage determination value V2mr and the engine 12 is cranked, a low-voltage standby flag is switched from OFF to ON and measurement of the retrial standby time Tw of the P-wall position setting control is started. At time point t3 in FIG. 10, the retrial standby time Tw is the predetermined time T1 and the P-wall position setting control is not restarted but is ended.

As described above, the SBW-ECU 38 according to this embodiment includes the counting unit 114 that acquires the encoder count value (the count value) corresponding to the degree of rotation of the electric actuator 17, the reference position setting unit 110 that sets the rotational position of the electric actuator 17 when the encoder count value does not vary due to restriction of rotation of the electric actuator 17 by the P wall 106 as an interim P-wall position and sets the reference position (the P-wall position) of the electric actuator 17 corresponding to the P position by correcting the interim P-wall position, and the voltage determining unit 116 that determines the supply voltage Vmr from the power storage unit 52 to the electric actuator 17. The reference position setting unit 110 interrupts the P-wall position setting control without setting the P-wall position of the electric actuator 17 when the voltage determining unit 116 determines that the supply voltage Vmr to the electric actuator 17 is equal to or lower than the preset first supply voltage determination value V1mr in the P-wall abutting state in the P-wall position detection control or when the variation in the minimum value or the maximum value of the encoder count value in the P-wall abutting state is equal to or greater than a predetermined value, restarts the P-wall position setting control of the electric actuator 17 when a predetermined condition that the P-wall position detection failure frequency is less than the allowable failure frequency or the like is satisfied. Accordingly, it is possible to prevent setting of the P-wall position in a state in which the electric actuator supply voltage Vmr is low and the predetermined torque required for accurately setting the P-wall position is not output from the electric actuator 17 in the P-wall abutting state in the P-wall position detection control of the electric actuator 17. As a result, it is possible to suppress a decrease in accuracy for setting the P-wall position of the electric actuator 17 due to a decrease in drive voltage of the electric actuator 17 in the P-wall position setting control and to prevent the shift position switching control from being performed based on the P-wall position with low accuracy.

The SBW-ECU 38 according to this embodiment includes the interruption number counting unit 118 that counts the number of interruptions of the P-wall position setting control of the electric actuator 17 by the reference position setting unit 110. When the number of interruptions of the P-wall position setting control of the electric actuator 17, that is, the P-wall position detection failure frequency, reaches the allowable failure frequency, the reference position setting unit 110 does not restart but ends the P-wall position setting control for the purpose of setting the P-wall position of the electric actuator 17. Accordingly, it is possible to suppress a decrease in responsiveness to a start request from a driver or the like, for example, because a shift position switching request from the driver is not accepted due to switching of the P-wall position setting control.

In the SBW-ECU 38 according to this embodiment, the reference position setting unit 110 interrupts the P-wall position setting control when the variation in the encoder count value from the rotation start time point of the electric actuator 17, that is, the start time point of the P-wall position detection control, to the time point of the P-wall abutting at which rotation of the electric actuator 17 is restricted by the P wall 106 and thus the encoder count value does not vary is equal to or less than the predetermined variation B in the encoder count value, and restarts the P-wall position setting control when the condition in which the P-wall position detection failure frequency is less than the allowable failure frequency or the like is satisfied. Accordingly, when the difference (the variation in the encoder count value) between the encoder count value when the encoder count value does not vary and the encoder count value at the rotation start time of the electric actuator 17 is equal to or less than the predetermined variation B in the encoder count value in the P-wall abutting state in the P-wall position detection control of the electric actuator 17, it is possible to prevent setting of the P-wall position from being performed in a state in which a predetermined rotation angle for reaching the P-wall position is not guaranteed to be acquired by the electric actuator 17. As a result, it is possible to suppress a decrease in accuracy for setting the P-wall position of the electric actuator 17 due to a decrease in drive voltage of the electric actuator 17 in the P-wall position setting control and to prevent the shift position switching control from being performed based on the P-wall position with low accuracy of the electric actuator 17.

In the SBW-ECU 38 according to this embodiment, after interrupting the P-wall position setting control of the electric actuator 17, the reference position setting unit 110 restarts the P-wall position setting control when the retrial standby time Tw in which the P-wall position setting control is not restarted but is waited for because the state in which the electric actuator supply voltage Vmr is lower than the second supply voltage determination value V2$mr$ which is higher than the first supply voltage determination value V1$mr$ is maintained and the state in which the engine 12 is cranked is maintained, which is the time elapsing after the encoder count value is returned to the encoder count value at the start time point of the P-wall position detection control by the P-wall return control, that is, after it transitions to the wall abutting retrial, is less than the predetermined time T1 and the electric actuator supply voltage Vmr is equal to or greater than the second supply voltage determination value V2$mr$. Accordingly, when there is a high likelihood that the electric actuator supply voltage Vmr will be equal to or less than the first supply voltage determination value V1$mr$, the P-wall position setting control of the electric actuator 17 is not restarted. When the retrial standby time Tw is greater than the predetermined time T1 after the P-wall position setting control is interrupted, the P-wall position setting control is not restarted but is ended. Accordingly, it is possible to suppress a decrease in responsiveness to a start request from a driver, for example, because a shift position switching request from the driver is not accepted.

The SBW-ECU 38 according to this embodiment includes the ignition key switch 46 (a cranking operating unit) that cranks the engine 12 by driving the starter motor 58 which is supplied with power from the power storage unit 52 by a driver's operation. After the P-wall position setting control of the electric actuator 17 is interrupted, the reference position setting unit 110 restarts the P-wall position setting control of the electric actuator 17 when the retrial standby time Tw in which the P-wall position setting control is not restarted but is waited for because the state in which the electric actuator supply voltage Vmr is lower than the second supply voltage determination value V2$mr$ which is higher than the first supply voltage determination value V1$mr$ is maintained and the state in which the engine 12 is cranked is maintained, which is the time elapsing after the encoder count value is returned to the encoder count value at the start time point of the P-wall position detection control by the P-wall return control, that is, after it transitions to the wall abutting retrial, is less than the predetermined time T1 and cranking of the engine 12 ends. Accordingly, the P-wall position setting control of the electric actuator 17 is not restarted during cranking of the engine 12 in which the electric actuator supply voltage Vmr is likely to vary and there is a high likelihood that the electric actuator supply voltage Vmr will be equal to or lower than the first supply voltage determination value V1$mr$. When the retrial standby time Tw is greater than the predetermined time T1 after the P-wall position setting control is interrupted, the P-wall position setting control is not restarted but is ended. Accordingly, it is possible to suppress a decrease in responsiveness to a start request from a driver, for example, because a shift position switching request from the driver is not accepted.

Another embodiment of the present disclosure will be described below. In the following embodiment, elements which have functions substantially common to those in the above-mentioned embodiment will be referenced by the same reference signs and detailed description thereof will not be repeated.

Figure 11:
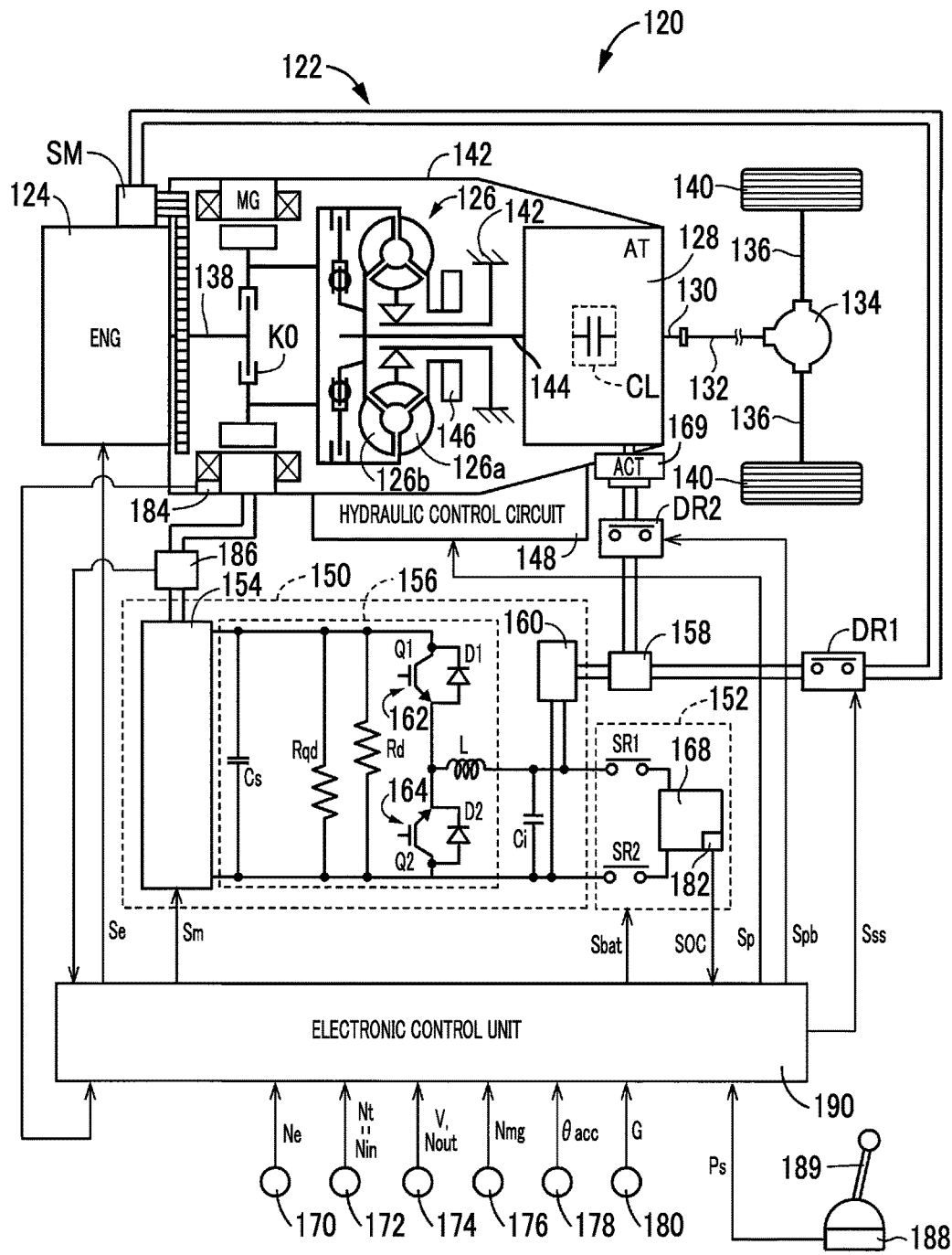
FIG. 11 is a diagram schematically illustrating a configuration of a hybrid vehicle according to another embodiment to which the present disclosure is applied and is also a diagram illustrating a principal part of a control system of the vehicle.

FIG. 11 is a diagram schematically illustrating a hybrid vehicle to which the present disclosure is applied and is also a diagram illustrating a principal part of a control system of the vehicle. In FIG. 11, a hybrid vehicle 120 is a hybrid vehicle including a power transmission unit 122 and an engine 124 and an electric motor MG which serve as a driving force source for traveling. The power transmission unit 122 includes an engine-engagement disengagement clutch K0 (hereinafter referred to as an engagement/disengagement clutch K0), a torque converter 126, and an automatic transmission 128 sequentially from the engine 124 side in a transmission case 142 as a non-rotary member. The power transmission unit 122 also includes a propeller shaft 132 that is connected to a transmission output shaft 130 which is an output rotary member of the automatic transmission 128, a differential gear 134 that is connected to the propeller shaft 132, and a pair of axles 136 that is connected to the differential gear 134. The power transmission unit 122 having the above-mentioned configuration is suitably used, for example, for a front engine-rear drive (FR) type vehicle 120. in the power transmission unit 122, a power (which has the same means as a torque and a force when they are not particularly distinguished) of the engine 124 is transmitted from a crank shaft 138 connecting a crank shaft of the engine 124 to the engagement/disengagement clutch K0 to a pair of driving wheels 140 sequentially via the engagement/disengagement clutch K0, the torque converter 126, the automatic transmission 128, the propeller shaft 132, the differential gear 134, a pair of axles 136, and the like. The electric motor MG is connected to the power transmission path between the engagement/disengagement clutch K0 and the torque converter 126 in the transmission case 142, and a power of the electric motor MG is transmitted to the driving wheels 140 sequentially via the torque converter 126, the automatic transmission 128, and the like when the engagement/disengagement clutch K0 is engaged. In this way, the power transmission unit 122 constitutes the power transmission path from the engine 124 to the driving wheels 140, A parking gear which is not illustrated and which engages with parking lock pawl of a parking lock unit 169 is fixed to a transmission output shaft 130 of the automatic transmission 128.

The torque converter 126 is a hydraulic power transmission device that outputs power from a turbine runner 126$b$ by transmitting the power input to a pump impeller 126$a$ via a fluid. The pump impeller 126$a$ is connected to the crank shaft 138 via the engagement/disengagement clutch K0 and is connected directly to the electric motor MG. The turbine runner 126$b$ is connected directly to a transmission input shaft 144 which is an input rotary member of the automatic transmission 18. The pump impeller 126a is connected to an oil pump 146. The oil pump 146 is a mechanical oil pump which is rotationally driven by the engine 124 (and/or the electric motor MG) and which generates a hydraulic pressure for performing gear shift control of the automatic transmission 128, engagement/disengagement control of the engagement/disengagement clutch K0, or the like.

The automatic transmission 128 is a transmission which constitutes a part of the power transmission path between the engine 124 and the electric motor MG and the driving wheels 140 and which transmits power from the driving force source for traveling (the engine 124 and the electric motor MG) to the driving wheels 140. The automatic transmission 128 is, for example, a known planetary gear type multi-stage transmission in which a plurality of shift stages (gear stages) having different shift ratios (gear ratios) $\gamma$(=transmission input rotation speed Nin/transmission output rotation speed Nout) are selectively set or a known non-stepped transmission in which the gear ratio $\gamma$ varies continuously in a non-stepped manner. The automatic transmission 128 includes a plurality of frictional engagement elements for selectively setting the plurality of gear stages, for example, by controlling hydraulic actuators thereof using a hydraulic control circuit 148. A predetermined gear stage (gear ratio) corresponding to a driver's operation of an accelerator pedal, a vehicle speed V, or the like is set by selectively causing two of the frictional engagement elements to engage with each other. When the automatic transmission is operated to a parking position or a neutral position, all the frictional engagement elements are disengaged and the power transmission path in the automatic transmission 128 is released. In FIG. 11, the plurality of frictional engagement elements are representatively illustrated as a clutch CL.

The electric motor MG serves as a motor and is a so-called motor generator having a function of a motor that generates a mechanical power from electric energy and a function of a power generator that generates electric energy from mechanical energy. The electric motor MG is constituted by a permanent magnet type electric motor, for example, an interior permanent magnet synchronous motor (IPM) of three phases in which a plurality of magnetic poles are formed in a rotor by magnetization and a stator forms a rotary magnetic field.

The electric motor MG is connected to a battery unit 152 via a power supply control unit (PCU) 150. The electric motor MG serves as a driving force source for traveling that generates a traveling power instead of the engine 124 as a power source or in addition to the engine 124. The electric motor MG performs an operation of generating electric energy by regeneration from a power generated from the engine 124 or a driven force input from the driving wheels 140 side and accumulating the generated electric energy in the battery unit 152 via the power supply control unit 150, and the like. The electric motor MG is operationally connected to the pump impeller 126a, and a power is transmitted between the electric motor MG and the pump impeller 126a. Accordingly, the electric motor MG is connected to the transmission input shaft 144 of the automatic transmission 128 such that a power can be transmitted therebetween without passing through the engagement/disengagement clutch K0.

A starting electric motor SM includes a pinion, which engages with a ring gear disposed on the crank shaft 138 of the engine 124, on an output shaft thereof and rotationally drives the engine 124 at the time of starting the engine 124. The starting electric motor SM converts a part of the output torque of the engine 124 into electric energy.

The engagement/disengagement clutch K0 is, for example, a wet type multi-disk hydraulic frictional engagement element in which a plurality of friction plates overlapping with each other are pressed by hydraulic actuators, and engagement and disengagement thereof are controlled by the hydraulic control circuit 148 using a hydraulic pressure generated from the oil pump 146 as a source pressure. In the control of engagement and disengagement, the torque capacity of the engagement/disengagement clutch K0 (hereinafter referred to as a K0 torque) is changed, for example, by adjusting a pressure of a linear solenoid valve in the hydraulic control circuit 148 or the like. In the engaged state of the engagement/disengagement clutch K0, the pump impeller 126a and the engine 124 rotate integrally via the crank shaft 138. Accordingly, the engine 124 and the electric motor MG are indirectly connected to each other via the engagement/disengagement clutch K0 without rotating to be relatively differential On the other hand, in the disengaged state of the engagement/disengagement clutch K0, transmission of a power between the engine 124 and the pump impeller 126a is intercepted. That is, the engine 124 is disconnected from the driving wheels 140 by disengaging the engagement/disengagement clutch K0. Since the electric motor MG is connected to the pump impeller 126a, the engagement/disengagement clutch K0 also serves as a clutch which is disposed in the power transmission path between the engine 124 and the electric motor MG and which intercepts or sets up the power transmission path.

The power supply control unit 150 is an electric circuit including a inverter unit 154 that controls delivery of a power associated with operation of the electric motor MG, a boost converter unit 156 that is disposed between the battery unit 152 and the inverter unit 154, a DC/DC converter 160 that charges an auxiliary machine battery 158 by decreasing a relatively high voltage on the battery unit 152 side to a low voltage of about 12 V to 24 V, a relay DR1 that controls the starting electric motor SM by supplying power of the auxiliary machine battery 158, and an input capacitor (or a filter capacitor) Ci that is disposed between terminals of the boost converter unit 156 on the battery unit 152 side.

The inverter unit 154 includes, for example, a known switching element and a switching operation of the switching element is controlled in accordance with a command from an electronic control unit 90 (particularly MG_ECU) to be described later such that an output torque or a regenerative torque required for the electric motor MG is acquired. The boost converter unit 156 includes a reactor L, an upper arm 162 (a switching element Q1 and a diode D1), a lower arm 164 (a switching element Q2 and a diode D2), a smoothing capacitor Cs serving as a power storage member that temporarily stores power associated with operation of the electric motor MG, and a discharging resistor Rd that is disposed in parallel to the smoothing capacitor Cs. The discharging resistor Rd has a sufficiently large resistance value and slowly discharges electric charges stored in the smoothing capacitor Cs, for example, at the time of ignition OFF.

The battery unit 152 includes a battery 168 which is a rechargeable secondary battery such as a lithium-ion battery pack or a nickel-hydrogen battery pack and system relays SR1 and SR2 that open and close an electrical path to the power supply control unit 150 (that is, connect and disconnect the battery 168 to and from the power supply control unit 150) in accordance with a command from an electronic control unit 90 (particularly the HV_ECU) to be described later. The battery 168 may be, for example, a capacitor.

The parking lock unit 169 includes a P lock mechanism (a parking lock mechanism), an electric actuator, and an encoder and operates to prevent movement of the vehicle 120 based on a command from an electronic control unit 190. The electric actuator of the parking lock unit 169 is supplied with power from the auxiliary machine battery 158 via a relay DR2 of which ON and OFF are controlled.

As illustrated in FIG. 2, the P lock mechanism of the parking lock unit 169 includes a shaft that is rotationally driven by an electric actuator, a detent plate that rotates with rotation of the shaft, a rod that operates with rotation of the detent plate, a parking gear that rotates with the driving wheels, a parking lock pawl that blocks (locks) rotation of the parking gear, a detent spring that limits rotation of the detent plate and fixes a shift position, and a roller.

Here, the detent plate of the P lock mechanism is provided with a P position and a non-P position as two valleys with one mountain therebetween at the top thereof. The parking lock unit 169 is switched to a switching position at which the roller is located at the P position of the detent plate and a switching position at which the roller is located at the non-P position of the detent plate by driving of the electric actuator. The switching position at which the roller of the parking lock unit 169 is located at the P position of the detent plate is a locked position at which the parking gear engages with the parking lock pawl, and a switching position at which the roller is located at the non-P position of the detent plate is an unlocked position at which the parking gear and the parking lock pawl are disengaged from each other. The parking lock unit 169 has a function of a shift switching unit that switches the shift position to one of a plurality of shift positions (a parking lock position and a non-parking lock position).

A P wall that restricts rotation in a predetermined rotating direction at the P position is disposed as a surface located on a side separated from a mountain at the P position of the detent plate. A non-P wall that restricts rotation in a predetermined rotating direction at the non-P position is disposed as a surface located on a side separated from a mountain at the non-P position of the detent plate. When the SBW-ECU 38 to be described later is switched from a non-started state to a started state, P-wall position setting control of the electric actuator is performed.

The vehicle 120 includes an electronic control unit 190 including a controller for the vehicle 120 associated with control of the vehicle as a whole or the like. The electronic control unit 190 is configured to include a so-called microcomputer which includes a CPU, a RAM, a ROM, and input and output interfaces, and the CPU performs a variety of controls of the vehicle 120 by performing signal processing in accordance with a program stored in advance in the ROM using a temporary storage function of the RAM. For example, the electronic control unit 190 is configured to perform output control of the engine 124, driving control of the electric motor MG including regeneration control of the electric motor MG, gear shift control of the automatic transmission 128, torque capacity control of the engagement/disengagement clutch K0, parking lock operation control of the parking lock unit 169, and the like and includes a hybrid control computer (HV_ECU), an electric motor control computer (MG_ECU), or a gear shift control computer (AT_ECU) that controls the vehicle and an SBW-ECU 38 for the parking lock unit 169 if necessary. The electronic control unit 190 is supplied with various signals (such as an engine rotation speed Ne which is a rotation speed of the engine 124, a turbine rotation speed Nt, that is, a transmission input rotation speed Nin which is a rotation speed of the transmission input shaft 144, a transmission output rotation speed Nout which is a rotation speed of the transmission output shaft 130 corresponding to the vehicle speed V, an electric motor rotation speed Nmg which is a rotation speed of the electric motor MG, an accelerator depression amount θacc corresponding to a required driving quantity from a driver to the vehicle 120, an acceleration (or a deceleration) G acting on the vehicle 10, a state of charge (a charging capacity) SOC of the battery 168, a rotation phase θ of the electric motor MG, driving currents Iu, Iv, and Iw to the electric motor MG, and a position Ps of the shift lever 189) based on detected values by various sensors (such as an engine rotation speed sensor 170, a turbine rotation speed sensor 172, an output shaft rotation speed sensor 174, an electric motor rotation speed sensor 176, an accelerator depression sensor 178, an acceleration sensor 180, a battery sensor 182, an electric motor rotation phase sensor 184, an electric motor driving current sensor 186, and a lever position sensor 188). The electronic control unit 190 supplies various command signals (such as an engine control command signal Se, an electric motor control command signal Sm, a hydraulic control command signal Sp, a power supply control command signal Sbat, a starting signal Sss, and a P switching control command signal Spb) to units disposed in the vehicle 120 (such as the engine 124, the inverter unit 154, the hydraulic control circuit 148, the battery unit 152, the relay DR1, and the relay DR2).

The HV-ECU of the electronic control unit 190 has a function of controlling driving of the engine 124 and a function of controlling operating of the electric motor MG. When motor driving (EV driving) in which the vehicle travels using only the electric motor MG as a driving force source for traveling is performed, the HV-ECU disengages the engagement/disengagement clutch K0 to intercept the power transmission path between the engine 124 and the torque converter 126 and causes the MG-ECU to output an MG torque Tmg required for the EV driving from the electric motor MG. On the other hand, when engine driving, that is, hybrid driving (EHV driving), in which the vehicle travels using at least the engine 124 as a driving force source for traveling is performed, the HV-ECU engages the engagement/disengagement clutch K0 to set up the power transmission path between the engine 124 and the torque converter 126 and causes the MG-ECU to output an MG torque Tmg as an assist torque from the electric motor MG if necessary while outputting an engine torque Te required for the EHV driving from the engine 124.

The MG-ECU controls operating of the electric motor MG as a driving force source or a power generator by outputting an electric motor control command signal Sm for controlling the inverter unit 154 or the like such that a required MG torque Tmg is acquired based on a command signal from the HV-ECU (that is, based on communication with the HV-ECU).

The AT-ECU determines whether to perform a gear shift of the automatic transmission 128, for example, based on vehicle conditions (such as an actual vehicle speed V and a required driving quantity calculated by the HV-ECU) from predetermined known relationships (such as a gear shift diagram or a gear shift map which is not illustrated), and performs automatic gear shift control of the automatic transmission 128 by outputting a hydraulic control command signal Sp (for example, a gear shift command value) for acquiring the determined gear stage (a gear ratio) to the hydraulic control circuit 148.

The SBW-ECU 38 performs P-wall position setting control of the electric actuator with power of the auxiliary machine battery 158 using an encoder by outputting a control signal to the relay DR2 in order to acquire the absolute position of the electric actuator of the parking lock unit 169 when the SBW-ECU is switched from the non-started state to the started state. When the state of charge of the battery 168 when the power supply state of the vehicle 120 is in the READY-ON state is low, for example, when the engine 124 is started using the starting electric motor SM, the P-wall position setting control of the electric actuator and cranking control of the engine 124 may be performed in parallel.

When the P-wall position setting control of the electric actuator and the cranking control of the engine 124 are performed at the same time, for example, when a supply voltage Vmr to the electric actuator from the auxiliary machine battery 158 decreases to be equal to or lower than a first supply voltage determination value V1$mr$ in a abutting state of the P wall in the P-wall position detection control, similarly to the first embodiment, the P-wall position setting control is interrupted and the P-wall position setting control is restarted when a predetermined condition in which the P-wall position detection failure frequency is less than an allowable failure frequency is satisfied. Accordingly, it is possible to prevent setting of a P-wall position with low accuracy. As a result, according to the SBW-ECU 38, in the hybrid vehicle 120 according to this embodiment, the same advantages as in the first embodiment are achieved and switching of the P position and the non-P position is prevented from being performed based on a P-wall position of the electric actuator with low accuracy.

While the present disclosure has been described above in detail with reference to tables and drawings, the present disclosure can be embodied in other aspects and can be modified in various forms without departing from the gist of the present disclosure.

For example, in the first embodiment, the P-wall position of the electric actuator 17 is set when the SBW-ECU 38 is switched from the non-started state to the started state, but applicable embodiments of the present disclosure is not limited thereto. Depending on the shift position when the SBW-ECU 38 is switched from the non-started state to the started state, the detent plate 74 may be rotated in the direction of D in FIG. 2 and the D-wall position of the electric actuator 17 may be set. When the electric actuator supply voltage Vmr is lower than a predetermined voltage in a D-wall abutting state, D-wall position setting control is interrupted and thus accuracy for setting the D-wall position is prevented from decreasing.

In the first embodiment, when the retrial Standby time Tw which is an elapsed time after the encoder count value is returned to the encoder count value at the start time of the P-wall position detection control and in which the P-wall position setting control is not restarted but is waited for because the electric actuator supply voltage Vmr is less than a second supply voltage determination value V2$mr$ and the engine 12 is cranked is maintained over a predetermined time T1 after the P-wall position setting control is interrupted, the P-wall position setting control is not restarted but is ended, but applicable embodiments of the present disclosure is not limited to this configuration. For example, When the retrial standby time Tw which is an elapsed time after the encoder count value is returned to the encoder count value at the start time of the P-wall position detection control and in which the P-wall position setting control is not restarted but is waited for because the electric actuator supply voltage Vmr is less than a second supply voltage determination value V2$mr$ regardless of whether the engine 12 is cranked is maintained over a second low-voltage duration determination time after the P-wall position setting control is interrupted, or when the retrial standby time Tw which is an elapsed time after the encoder count value is returned to the encoder count value at the start time of the P-wall position detection control and in which the P-wall position setting control is not restarted but is waited for because the engine 12 is cranked regardless of the electric actuator supply voltage Vmr is maintained over a second cranking duration determination time after the P-wall position setting control is interrupted, the P-wall position setting control may not be restarted but ended.

When an elapsed time after the electric actuator supply voltage Vmr becomes lower than the second supply voltage determination value V2$mr$ is maintained over a predetermined time T2 after the P-wall position setting control is interrupted, the P-wall position setting control may not be restarted but ended.

When an elapsed time after cranking is started is equal to or greater than the predetermined time T2 during cranking after the P-wall position setting control is interrupted, the P-wall position setting control may not be restarted but ended. The predetermined time T2 is set, for example, to be an end time point of the predetermined time T1 and a target end time In the first embodiment, the starter motor 58 that cranks the engine 12 and the electric actuator 17 are supplied with power from a common power storage unit 52, but applicable embodiments of the present disclosure is not limited to this configuration. For example, the starter motor 58 and the electric actuator 17 may be configured to be supplied with power from different power storage units and the P-wall position setting control may he ended when the electric actuator supply voltage Vmr is equal to or lower than the first supply voltage determination value V1$mr$ regardless of whether the engine 12 is cranked. With this configuration, it is possible to suppress a decrease in accuracy for setting the P-wall position of the electric actuator 17 because the supply voltage to the electric actuator 17 in the P-wall abutting state is low.

In the first embodiment, the P-wall position setting control is interrupted by the reference position setting unit 110 and the P-wall position detection failure counter is increased by the interruption number counting unit 118 whenever the P-wall position detection failure flag is switched from OFF to ON. However, applicable embodiments of the present disclosure is not limited to this configuration, and for example, the P-wall position detection failure flag may not be separately provided and the P-wall position detection failure counter may be increased by the interruption number counting unit 118 whenever the P-wall position setting control is interrupted.

The above-mentioned description is only examples, and the present disclosure can be modified and improved in various forms based on the knowledge of those skilled in the art without departing from the gist of the present disclosure, although these examples are not individually exemplified.

What is claimed is:

1. A shift controller for a vehicle, comprising:
a shift switching unit configured to switch a shift position of the vehicle to one of a plurality of shift positions by driving an actuator which is supplied with power from a power supply;

a rotation restricting element configured to restrict rotation of the actuator in a predetermined direction at a predetermined shift position among the plurality of shift positions; and an electronic control unit configured to acquire a count value corresponding to a degree of rotation of the actuator, set a rotational position of the actuator when the count value does not change by restricting rotation of the actuator using the rotation restricting element as a reference position of the actuator corresponding to the predetermined shift position, and interrupt setting the reference position of the actuator and restart setting the reference position of the actuator when the following conditions (1) and (2) are met: (1) the rotation of the actuator is restricted by the rotation restricting element and (2) either (a) a supply voltage to the actuator is equal to or lower than a predetermined first voltage determination value or (b) a variation in the count value while the rotation of the actuator is restricted by the rotation restricting element is equal to or greater than a predetermined value.

2. The shift controller for a vehicle according to claim 1, wherein the electronic control unit is configured to count the number of interruptions in setting the reference position of the actuator, and the electronic control unit is configured not to restart setting the reference position of the actuator but to end setting the reference position of the actuator when the number of interruptions is equal to or greater than a predetermined value, even when the conditions (1) and (2) are met.

3. The shift controller for a vehicle according to claim 1, wherein the electronic control unit is configured to interrupt setting the reference position of the actuator and to restart setting the reference position of the actuator when rotation of the actuator is restricted by the rotation restricting element and a difference between the count value at the time of starting rotation of the actuator and the count value in a state in which the count value does not vary is equal to or less than a predetermined value.

4. The shift controller for a vehicle according to claim 1, wherein the electronic control unit is configured to restart setting the reference position of the actuator when a duration of a state in which the supply voltage to the actuator is lower than a second voltage determination value which is set to be higher than the first voltage determination value is less than a predetermined time after the setting of the reference position is interrupted.

5. The shift controller for a vehicle according to claim 1, wherein the electronic control unit is configured to restart setting the reference position of the actuator when a duration of a state in which an internal combustion engine is cranked by driving of a starter motor which is supplied with power from the power supply is less than a predetermined time after the setting of the reference position of the actuator is interrupted.

6. The shift controller for a vehicle according to claim 1, wherein the electronic control unit is configured to restart setting the reference position of the actuator when a duration of a state in which the supply voltage to the actuator is lower than a second voltage determination value from a time point at which the count value of the actuator is returned to the count value at the time of starting rotation of the actuator is less than a predetermined time after the setting of the reference position is interrupted.

7. The shift controller for a vehicle according to claim 1, wherein the electronic control unit is configured to restart setting the reference position of the actuator when a duration of a state in which an internal combustion engine is cranked from a time point at which the count value of the actuator is returned to the count value at the time of starting rotation of the actuator is less than a predetermined time after the setting of the reference position is interrupted.

* * * * *

UNITED STATES PATENT AND TRADEMARK OFFICE
CERTIFICATE OF CORRECTION

PATENT NO. : 10,309,533 B2
APPLICATION NO. : 15/669337
DATED : June 4, 2019
INVENTOR(S) : Atsushi Kamada et al.

It is certified that error appears in the above-identified patent and that said Letters Patent is hereby corrected as shown below:

On the Title Page

Item (73), please insert the second Assignee as follows:
--DENSO CORPORATION, Kariya (JP)--

Signed and Sealed this
Tenth Day of March, 2020

Andrei Iancu
*Director of the United States Patent and Trademark Office*